United States Patent
Moshir et al.

(10) Patent No.: US 10,789,594 B2
(45) Date of Patent: Sep. 29, 2020

(54) METHOD AND SYSTEM TO INTELLIGENTLY ASSESS AND MITIGATE SECURITY RISKS ON A MOBILE DEVICE

(71) Applicants: Kevin K Moshir, Scottsdale, AZ (US); Sean Moshir, Scottsdale, AZ (US); Ali A Khanban, Scottsdale, AZ (US); Shayan Mashatian, Toronto (CA)

(72) Inventors: Kevin K Moshir, Scottsdale, AZ (US); Sean Moshir, Scottsdale, AZ (US); Ali A Khanban, Scottsdale, AZ (US); Shayan Mashatian, Toronto (CA)

(73) Assignee: Moshir Vantures, Limited, LLC, Scottsdale, AZ (US)

( * ) Notice: Subject to any disclaimer, the term of this patent is extended or adjusted under 35 U.S.C. 154(b) by 292 days.

(21) Appl. No.: 14/170,449

(22) Filed: Jan. 31, 2014

(65) Prior Publication Data
US 2014/0214610 A1 Jul. 31, 2014

Related U.S. Application Data

(60) Provisional application No. 61/759,133, filed on Jan. 31, 2013.

(51) Int. Cl.
G06Q 20/16 (2012.01)
G06Q 20/40 (2012.01)
(52) U.S. Cl.
CPC ................................ *G06Q 20/4016* (2013.01)
(58) Field of Classification Search
None
See application file for complete search history.

(56) References Cited

U.S. PATENT DOCUMENTS 3,833,885 A 9/1974 Gentile
5,436,960 A 7/1995 Campana
(Continued)

FOREIGN PATENT DOCUMENTS

EP 1569482 8/2005
EP 1657944 5/2006
(Continued)

OTHER PUBLICATIONS

3GPP Organizational Partners: "3rd Generation Partnership Project, Technical Realization of the Shortm Message Service (SMS)," 3GPP TS 23.010 Release 7.0.0, 2007, pp. 1-7 and 69-107.
(Continued)

*Primary Examiner* — Alan S Miller
*Assistant Examiner* — Arif Ullah
(74) *Attorney, Agent, or Firm* — Richard E. Oney; Venjuris, P.C.

(57) ABSTRACT

A method and system is provided for evaluating an application manufacturer's credibility to produce or maintain a mobile device application. The method includes gathering information about an application manufacturer, wherein the information includes at least one of: (i) publicly available information about the manufacture; (ii) private information provided by the manufacturer; and (iii) source code information for the application developed by the manufacturer. With the computer system, the gathered information is stored in a manufacturer profile, which includes a plurality of attributes of the manufacturer. The computer system uses the manufacturer profile to calculate a score for the manufacturer, which is then used to calculate an application risk score associated with applications produced or maintained by the manufacturer. The risk score reflects, at least in part, the credibility of the manufacturer to produce or maintain the mobile device application.

24 Claims, 10 Drawing Sheets

(56) References Cited

U.S. PATENT DOCUMENTS

| | | |
|---|---|---|
| 5,625,670 A | 4/1997 | Campana |
| 5,668,880 A | 9/1997 | Alajajian |
| 5,819,172 A | 10/1998 | Campana |
| 6,067,451 A | 5/2000 | Campana |
| 6,081,601 A | 6/2000 | Raivisto |
| 6,259,909 B1 | 7/2001 | Ratayczak |
| 6,317,592 B1 | 11/2001 | Campana |
| 6,493,758 B1 | 12/2002 | McClain |
| 6,510,325 B1 | 1/2003 | Mack |
| 6,769,607 B1 | 8/2004 | Pitroda |
| 6,871,063 B1 | 3/2005 | Schiffer |
| 6,970,095 B1 | 11/2005 | Lee |
| 6,988,657 B1 | 1/2006 | Singer |
| 7,012,503 B2 | 3/2006 | Nielsen |
| 7,039,708 B1 | 5/2006 | Knobl |
| 7,050,945 B2 | 5/2006 | Oba |
| 7,073,200 B2 | 7/2006 | Maliszewski |
| 7,248,895 B2 | 7/2007 | Shiraogawa |
| 7,286,818 B2 | 10/2007 | Rosenberg |
| 7,299,263 B2 | 11/2007 | Claudatos |
| 7,308,477 B1 | 12/2007 | Gress |
| 7,394,761 B2 | 7/2008 | Foster |
| 7,437,146 B2 | 10/2008 | Dudley et al. |
| 7,537,152 B2 | 5/2009 | Chakiris |
| 7,565,577 B2 | 7/2009 | Adams |
| 7,643,821 B2 | 1/2010 | O'Hanlon |
| 7,649,998 B2 | 1/2010 | Harran |
| 7,702,898 B2 | 4/2010 | Tan |
| 7,996,673 B2 | 8/2011 | Ivanov |
| 8,037,297 B2 | 10/2011 | Pekkala |
| 8,117,273 B1 | 2/2012 | Mathur |
| 8,407,780 B2 | 3/2013 | Bandini et al. |
| 8,631,227 B2 | 1/2014 | Olechowski et al. |
| 2001/0003203 A1 | 6/2001 | Mache |
| 2001/0011250 A1 | 8/2001 | Paltenghe |
| 2002/0016175 A1 | 2/2002 | Marce |
| 2002/0069035 A1* | 6/2002 | Tracy ............... G06Q 30/018 702/181 |
| 2002/0086656 A1 | 7/2002 | Matthison |
| 2002/0088853 A1 | 7/2002 | Itoh |
| 2002/0107745 A1 | 8/2002 | Loeser |
| 2002/0116345 A1 | 8/2002 | Harrison |
| 2002/0133557 A1 | 9/2002 | Winarski |
| 2002/0161476 A1 | 10/2002 | Panofsky |
| 2002/0165926 A1 | 11/2002 | Rensin |
| 2002/0186845 A1 | 12/2002 | Dutta |
| 2003/0022655 A1 | 1/2003 | Bogat |
| 2003/0043036 A1 | 3/2003 | Merrem |
| 2003/0115288 A1 | 6/2003 | Ljubicich |
| 2003/0120957 A1 | 6/2003 | Pathiyal |
| 2003/0169151 A1 | 9/2003 | Ebling |
| 2003/0224766 A1 | 12/2003 | Stockhammer |
| 2003/0233409 A1 | 12/2003 | Awada |
| 2004/0075594 A1 | 4/2004 | Kuo |
| 2004/0117262 A1 | 6/2004 | Berger |
| 2004/0124966 A1 | 7/2004 | Forrest |
| 2004/0127256 A1 | 7/2004 | Goldthwaite |
| 2004/0147270 A1 | 7/2004 | Petrovich |
| 2004/0204041 A1 | 10/2004 | Fillebrown |
| 2004/0225565 A1 | 11/2004 | Selman |
| 2005/0015451 A1 | 1/2005 | Sheldon |
| 2005/0055578 A1 | 3/2005 | Wright |
| 2005/0064814 A1 | 3/2005 | Matsuo |
| 2005/0086261 A1 | 4/2005 | Mammone |
| 2005/0096117 A1 | 5/2005 | Katz |
| 2005/0114671 A1 | 5/2005 | Little |
| 2005/0120230 A1 | 6/2005 | Waterson |
| 2005/0160062 A1 | 7/2005 | Howard |
| 2005/0187873 A1 | 8/2005 | Labrou |
| 2005/0187882 A1 | 8/2005 | Sovio |
| 2005/0192008 A1 | 9/2005 | Desai |
| 2005/0221792 A1 | 10/2005 | Matthison |
| 2005/0221800 A1 | 10/2005 | Jackson |
| 2005/0222961 A1 | 10/2005 | Staib |
| 2005/0238149 A1 | 10/2005 | De Leon |
| 2005/0250538 A1 | 11/2005 | Narasimhan |
| 2005/0282521 A1 | 12/2005 | Hermann |
| 2006/0009234 A1 | 1/2006 | Freer |
| 2006/0031328 A1 | 2/2006 | Malik |
| 2006/0043201 A1 | 3/2006 | Vesikivi |
| 2006/0052055 A1 | 3/2006 | Rowse |
| 2006/0080232 A1 | 4/2006 | Epps |
| 2006/0099976 A1 | 5/2006 | Coskun |
| 2006/0117104 A1 | 6/2006 | Taniguchi |
| 2006/0120348 A1 | 6/2006 | Croak |
| 2006/0168657 A1 | 7/2006 | Baentsch |
| 2006/0180660 A1 | 8/2006 | Gray |
| 2006/0190729 A1 | 8/2006 | Uchida |
| 2006/0194572 A1 | 8/2006 | Fresonke et al. |
| 2006/0199598 A1 | 9/2006 | Lee |
| 2006/0240806 A1 | 10/2006 | Demirbasa |
| 2006/0240809 A1 | 10/2006 | Yu |
| 2006/0258289 A1 | 11/2006 | Dua |
| 2007/0032225 A1 | 2/2007 | Konicek |
| 2007/0046477 A1 | 3/2007 | Kolo et al. |
| 2007/0129113 A1 | 6/2007 | Klicpera |
| 2007/0129144 A1 | 6/2007 | Katz |
| 2007/0130476 A1 | 6/2007 | Mohanty |
| 2007/0202806 A1 | 8/2007 | Kim |
| 2007/0202897 A1 | 8/2007 | Smith |
| 2007/0208942 A1 | 9/2007 | May |
| 2007/0224980 A1 | 9/2007 | Wakefield |
| 2007/0249375 A1 | 10/2007 | Zapata |
| 2007/0255620 A1 | 11/2007 | Tumminaro |
| 2008/0014869 A1 | 1/2008 | Demirbasa |
| 2008/0019530 A1 | 1/2008 | Eldridge |
| 2008/0022418 A1 | 1/2008 | Wei |
| 2008/0058057 A1 | 3/2008 | Lau |
| 2008/0085728 A1 | 4/2008 | Reding |
| 2008/0094230 A1 | 4/2008 | Mock et al. |
| 2008/0096590 A1 | 4/2008 | Celik |
| 2008/0148042 A1 | 6/2008 | Brown |
| 2008/0178300 A1 | 7/2008 | Brown |
| 2008/0292101 A1 | 11/2008 | Macchi |
| 2008/0300024 A1 | 12/2008 | Sweeney |
| 2009/0060198 A1 | 3/2009 | Little |
| 2009/0075630 A1 | 3/2009 | McLean |
| 2009/0113543 A1 | 4/2009 | Adams |
| 2009/0163140 A1 | 6/2009 | Packham |
| 2009/0257593 A1 | 10/2009 | Losovsky |
| 2010/0002686 A1 | 1/2010 | Rosenberg et al. |
| 2010/0070448 A1 | 3/2010 | Omoigui |
| 2010/0159962 A1 | 6/2010 | Cai |
| 2010/0197326 A1 | 8/2010 | Ngo |
| 2010/0217979 A1 | 8/2010 | Yaghmour |
| 2011/0222688 A1 | 9/2011 | Graham et al. |
| 2013/0227683 A1* | 8/2013 | Bettini ............... G06F 21/57 726/22 |
| 2013/0239177 A1* | 9/2013 | Sigurdson ............ H04L 63/102 726/4 |
| 2014/0114962 A1* | 4/2014 | Rosenburg ........... G06Q 10/063 707/723 |

FOREIGN PATENT DOCUMENTS

| | | |
|---|---|---|
| FR | 2863811 | 6/2005 |
| GB | 2399670 | 9/2004 |
| JP | 2002279320 | 9/2002 |
| WO | WO9935784 | 7/1999 |
| WO | WO01178491 | 10/2001 |
| WO | WO2004075594 | 9/2004 |
| WO | WO2006007879 | 1/2006 |

OTHER PUBLICATIONS

Lauri Giesen, "Near-Field Dreams," http://www.digitaltransactions.net/files/Cover0306.doc.

Chen et al., "Short-range Wireless Technologies with Mobile Payments Systems," http://doi.acm.org/10.1145/1052220.1052302, XX/XX/2004, p. 649-656.

Noll et al., "Business through Mobile Phone initiated Near Field Communication," http://jnoll.homelinux.org/jnoll/ref/200505NUf-NFC-Mobile-Noll-Calvet.pdf, Nov. 5, 2005, p. 1-29.

(56) References Cited

OTHER PUBLICATIONS

James Lee, "NFC (Near Field Communication) technology + mobile phones=Interesting potential uses," http://jnoll.homelinux.org/jnoll/ref/200505NUf-NFC-Mobile-Noll-Calvet.pdf, Feb. 1, 2006, p. 1-6.
Cellit Mobile Management, "House4Cell," http://www.house4cell.com, p. 1-2.
Cellsigns, Inc., "Cellsigns get mobile," http://www.cellsigns.com, p. 1-4.
Cellsigns, Inc., "Mobile Agent—Mobile Search for Real Estate," http://www.cellsigns.com/mobileagent/index.shtml, p. 1-2.
Sharp, Duncan Scott. "Adapting Ad Hoc Network Concepts to Land Mobile Radio Systems." Masters Thesis submitted to Simon Fraser University. Published Dec. 2002. [retrieved on May 16, 2008]. Retrieved from the internet <URL:htlp:llwww.ensc.sfu.caHjilja/cnVpdffduncan.pdf>, p. 1-98.
Written Opinion of the Infl Searching Authority; Infl Search Report dated Jun. 26, 2008, p. 1-10 for PCT International Application No. PCT/US08J55494.
Written Opinion of the Inn searching Authority; Infl Search Report dated Feb. 15, 2008, p. 1-14 for PCT International Application No. PCT/US07112436.
Phonefactor News. Two-Factor Authentication IMthout Tokens: Positive Networks Debuts PhoneFactorTM, May 22, 2007, htlp:llwww.phonefactor.comlnewsltow-fador-aulhenlication-without-tokens-positive-networks, p. 1-4, Overland, Park, KS.
Realwire From Webitpr, Clickatell Partners with RSA, The Security Division of EMC. to Provide Global Enterprise Customers with On-Demand Authentication using Cell Phones, May 27, 2008, hllp:/lwww.webitpr.comJ 0release_detail.asp7ReleaseID=8755, p. 1, Redwood City, CA.
CellTrust: "CellTrust Corporation Launches Worldwide Availability of SecureSMS Gateway at Mobile World Congress 2008" Press Release, Feb. 6, 2008.
Hassinen, M.; "SafeSMS—end-to-end encryption for SMS" Telecommunications 2005. Contel 2005. Proceedings of 2 the 9th Internet Ional Conference on Zagreb, Croatia Jun. 15-17, 2005, Piscataway, NJ, IEEE vol. 2, Jun. 15, 2005 pp. D 359-D 365.
Hassinen, M.; "Java based Public Key Infrastructure for SMS Messaging" [online] Apr. 28, 2006, p. 1-6.
Circletech: "Security of SMS Communication" [online] Jul. 4, 2007.
Toorani, M, et al.; "A Secure SMS Messaging Protocol for the M-Payment Systems," Department of Electrical Engineering Iran University of Science and Technology, IEEE 2008, Retrieved online Feb. 10, 2009.
Toorani, M, et al.: "Review of Security of Short Message Service," College of Electrical Engineering, University of Alem O Saanat of Iran and Apadana Research and Lab, Educational Paper, 2008, pp. 1-16.

\* cited by examiner

METHOD AND SYSTEM TO INTELLIGENTLY ASSESS AND MITIGATE SECURITY RISKS ON A MOBILE DEVICE

RELATED APPLICATION

This application claims the benefit of U.S. Provisional Application No. 61/759,133, filed Jan. 31, 2013, entitled "Method and System to Intelligently Assess Security on a Mobile Device," which is incorporated herein by reference.

COPYRIGHT NOTIFICATION

Portions of this patent application include materials that are subject to copyright protection. The copyright owner has no objection to the facsimile reproduction by anyone of the patent document itself, or of the patent application as it appears in the files of the United States Patent and Trademark Office, but otherwise reserves all copyright rights whatsoever in such included copyrighted materials.

BACKGROUND

This invention pertains generally to assessing manufacturers of mobile applications or computer programs ("apps"). More particularly, it relates to a system and method for collecting storing and analyzing information, including data about a manufacturer (sometimes referred to herein as a Company or Developer) of apps, and for calculating and communicating a risk score for apps produced or maintained, or to be produced or maintained, by the manufacturer.

Mobile communications have been called the most disruptive technological force of the past decade, the most successful consumer electronic device of all time and now more pervasive than television or even wristwatches (Castells, et al., 2007). Access to mobile phones has not been restricted to developed countries according to the 2012 International Telecommunication Unit (ITU). In 2008, five billion mobile phone subscribers existed worldwide and access to Internet by mobile phones exceeded access via Personal Computers. (http://officialandroid.blogspot.ca/2012/09/google-play-hits-25-billion-down loads.html.) Installing software applications on smart phones has contributed to the growth of mobile technology used in daily life. Using software applications on mobile technology has been available for many years, even on feature phones. The introduction of an email application on RIM's Blackberry phone ("Blackberry"), followed by software applications on the iPhone in 2007, and then the Android operating system by Google took the use of mobile applications (sometimes referred to herein as "Apps") to the mass market. In September 2012, the Google Play store—which supports Android applications—reported that it offers 675,000 applications for Android devices. Google also announced that 25 billion mobile applications have been downloaded since the introduction of the Android operation system for smart phones (http://officialandroid.blogspot.ca/2012/09/google-play-hits-25-billion-downloads.html). Apple Inc., announced that it has 700,000 in the Apple Store, its users have created more than 400 million accounts, and as of June 2012, those mobile applications have been downloaded 30 billion times (http://mashable.com/2012/06/11/wwdc-2012-app-store-stats/).

Applications installed on mobile phones, have the potential to access personal information stored on the phone. Such information includes, but is not limited to, stored messages, current location of the mobile phone, location of the user, and history of phone calls received, dialed and missed. Mobile applications also have the potential to obtain permission to activate certain features on the phone such as a microphone. Access permissions to data or functions from some applications are necessary to deliver what the application promises. A number of factors—such as rapidly developed and deployed applications, vulgar permission systems, privacy invading behaviors (Enck, et al 2010; Egele, et. al, 2011; Goodin, D, 2009), malware, and limited security models (Ongtang, et al, 2010; Ongtang, et al, 2009)—have led to a vulnerable environment that compromises and puts at risk users' security and privacy.

The need for protecting data on mobile phones is not limited to individual users. Businesses are also facing the challenge of protecting confidential and sensitive business information. RIM's Blackberry phone was the first mobile phone or smart phone used in a business environment. When it was introduced, Blackberry was supported with a service to enforce confidentiality and privacy policies on business phones. Today, however, with other platforms available, employees use their favorite mobile devices (such as iPhone, Android phones, Windows phones, etc.) for both personal and business use. IT departments resist the idea of mixing personal mobile devices with business use; however, there are various reports that the practice is happening and the trend is known as BYOD—Bring Your Own Device. Therefore, businesses are increasingly faced with issues of protecting the confidential data stored on mobile devices used personally and for business.

Typically, when evaluating the vulnerability of a mobile application or computer program ("app") for security and privacy risks, one of the initial steps is to scan the apps on the mobile device or the program on computer in order to collect the attributes of the app or program and compare those discovered attributes with a list of known attributes that are considered malicious. For example, anti-virus programs scan the app and compare attributes discovered during the scan with the signature of a virus, which is a series of bits or bytes that together compose the virus. To date, evaluations of the security and privacy risks of apps have focused primarily on these scans for malicious code or other traits within the app itself, such as the type of permissions the app requires, the type of data it accesses, the other apps or website with which it communicates, or the process it uses to transmit data. There have been a variety of methods of evaluating vulnerabilities and the privacy and security of an app or program by evaluating the attributes of the app itself.

However, the main source of a vulnerability or malicious program often starts at the origin with the development of the app. Either the developer is purposefully creating a malicious code or a qualified programmer inadvertently fails to code the app appropriately causing a vulnerability in the app such as back door access, which means the app allows an unauthorized access if certain steps are followed. There are security best practices for app development that guide programmers in developing codes that are more secure and less vulnerable. For example, the guideline published by Federal Trade Commission's Bureau of Consumer Protection (http://www.business.ftc.gov/documents/bus83-mobile-app-developers-start-security) offers tips to help developers approach mobile app security.

Moreover, for some users, such as financial institutions, the security posture of a manufacturer is important because, as a vendor, the manufacturer may have to comply with the strict security requirements, such as protecting financial data. Currently, however, properly evaluating the manufacturer of an app is a long and tedious process. It often requires long negotiations between parties and drafting of legal contracts, the review of lengthy and detailed business documentation supplied by the manufacturer, such as on its processes and procedures, IT, or other systems and practices, and detailed discussions with multiple members of the manufacturer's staff.

It is clear that a need exists for a method and system that can properly categorize or rank manufacturers of apps so that organizations can know the enterprise readiness of such manufacturers. Such a method and system could save organizations valuable time and resources in evaluating whether an app is ready for their type of business. It is an object of the present invention to provide such a method and system.

Additional objects and advantages of the invention will be set forth in the description that follows, and in part will be apparent from the description, or may be learned by practice of the invention. The objects and advantages of the invention may be realized and obtained by means of the instrumentalities and combinations pointed out in this specification.

SUMMARY

To achieve the foregoing objects, and in accordance with the purposes of the invention as embodied and broadly described in this document, there is provided a method and system for evaluating an application manufacturer's credibility to produce or maintain a mobile device application. The method includes gathering information about an application manufacturer, wherein the information includes at least one of: (i) publicly available information about the manufacture; (ii) private information provided by the manufacturer; and (iii) source code information for the application developed by the manufacturer. With a computer system, the gathered information is stored in a manufacturer profile, which includes a plurality of manufacturer attributes. The computer system uses the manufacturer profile to calculate a score for the manufacturer, which is then used to calculate an application risk score associated with applications produced or maintained by the manufacturer. The application risk score reflects, at least in part, the credibility of the manufacturer to produce or maintain the mobile device application.

The method and system of the present invention provide numerous benefits over previously known vulnerability assessment approaches. In contrast to the traditional vulnerability assessment, which starts with scanning the apps on a device and is limited to evaluation of existing apps, the method and system of the present invention can signify the expected quality of apps that may be produced by a given manufacturer in the future. For example, a manufacturer may have thirty apps in the market. While the traditional approach has been to evaluate and rate all thirty apps, the present invention can produce one score that relates to all thirty apps. Furthermore, with the present invention, one can reasonably expect future apps to be in line with the manufacturer score, even though the apps are not in the market yet. Furthermore, where the traditional approach requires an app to be in the market long enough to be scanned and evaluated, the present invention can provide an indication of the quality of the app as soon as it is released to the market, or even prior to launching of the app to the market. If a manufacturer has produced a series of apps, the quality of the produced apps can signify the legitimacy of the manufacturer. For example, if a manufacturer has produced six apps and two of the apps abuse the consumer's personal information, the seventh app produced by the manufacturer may be considered high risk when launched to the market.

BRIEF DESCRIPTION OF EXEMPLARY DRAWINGS

The accompanying drawings, which are incorporated in and constitute a part of the specification, illustrate exemplary and presently preferred methods and embodiments of the invention. Together with the general description given above and the detailed description of the preferred methods and embodiments given below, they serve to explain the principles of the invention.

Figure 4:
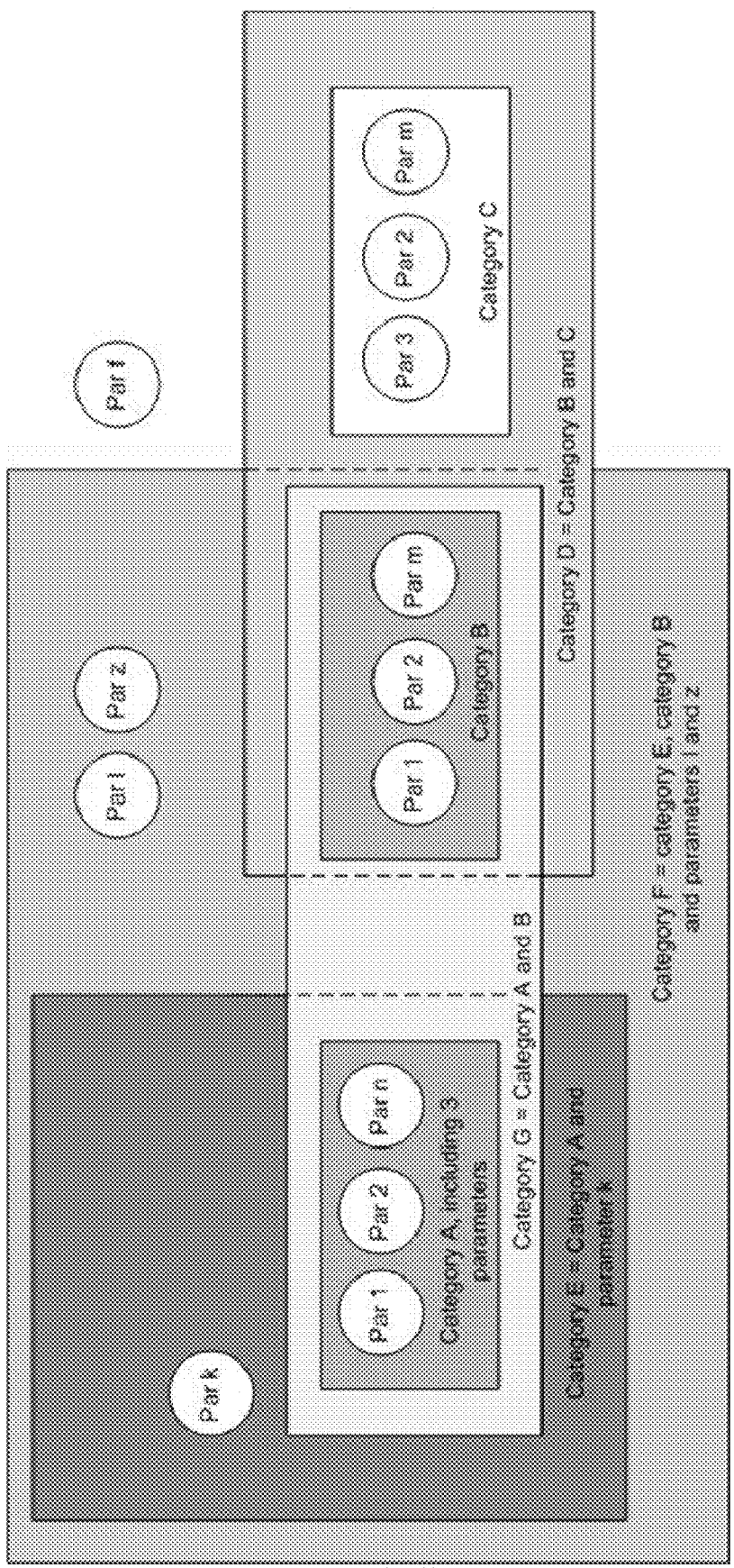

FIG. 4 is a diagram illustrating an example of how parameters, or types of data (such gathered data about a manufacturer), can be grouped into one or more categories (such as a manufacturer category and a privacy category) and how scores for each of the parameters and categories can be used to calculate an overall risk score that reflects the credibility of the manufacturer to produce or maintain the mobile application.

Figure 5:
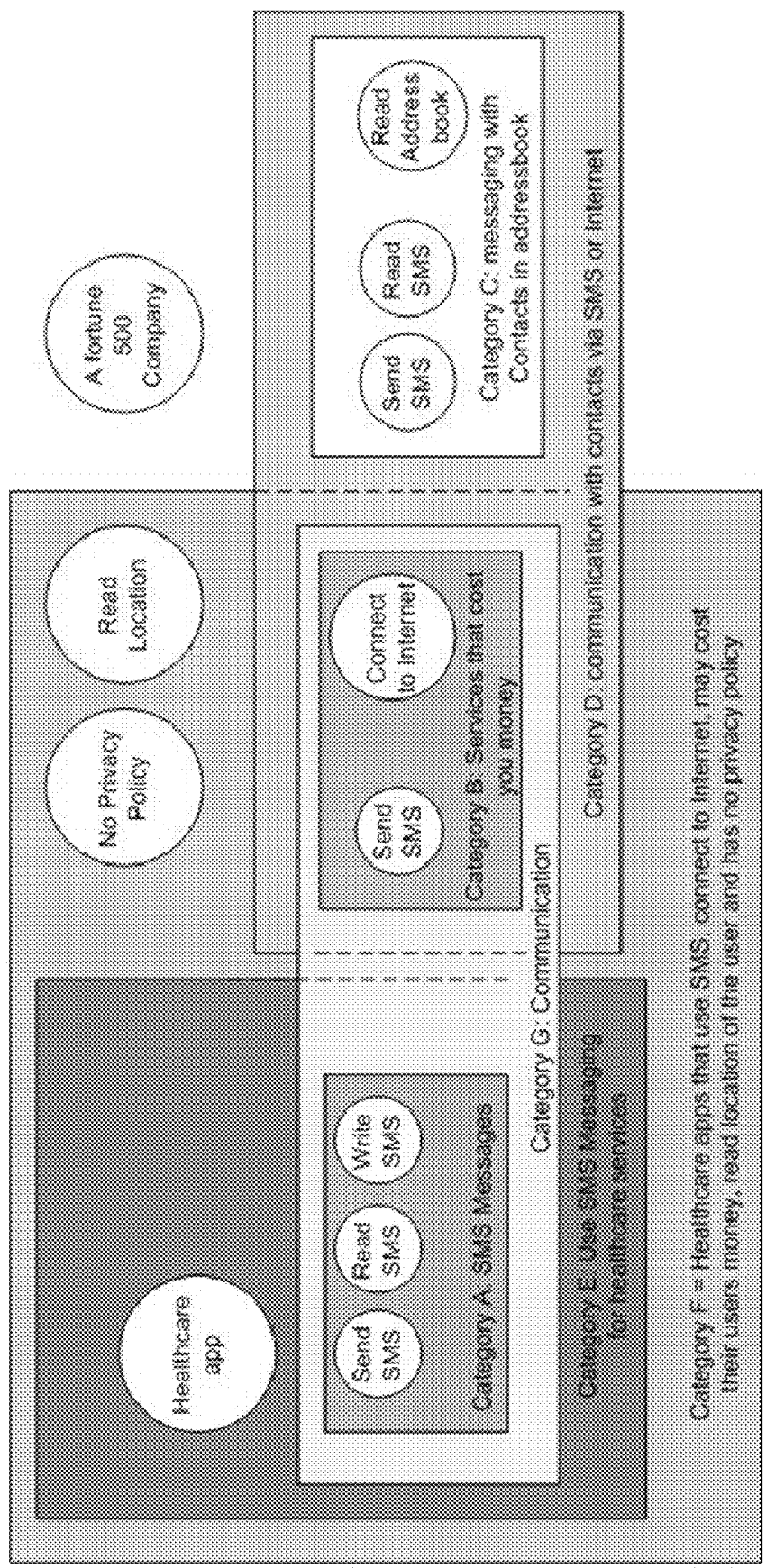

FIG. 5 is a diagram like that of FIG. 4 showing the combination of some specific examples of categories and parameters used for calculating an overall risk score that reflects the credibility of the manufacturer to produce or maintain the mobile application.

Figure 6:
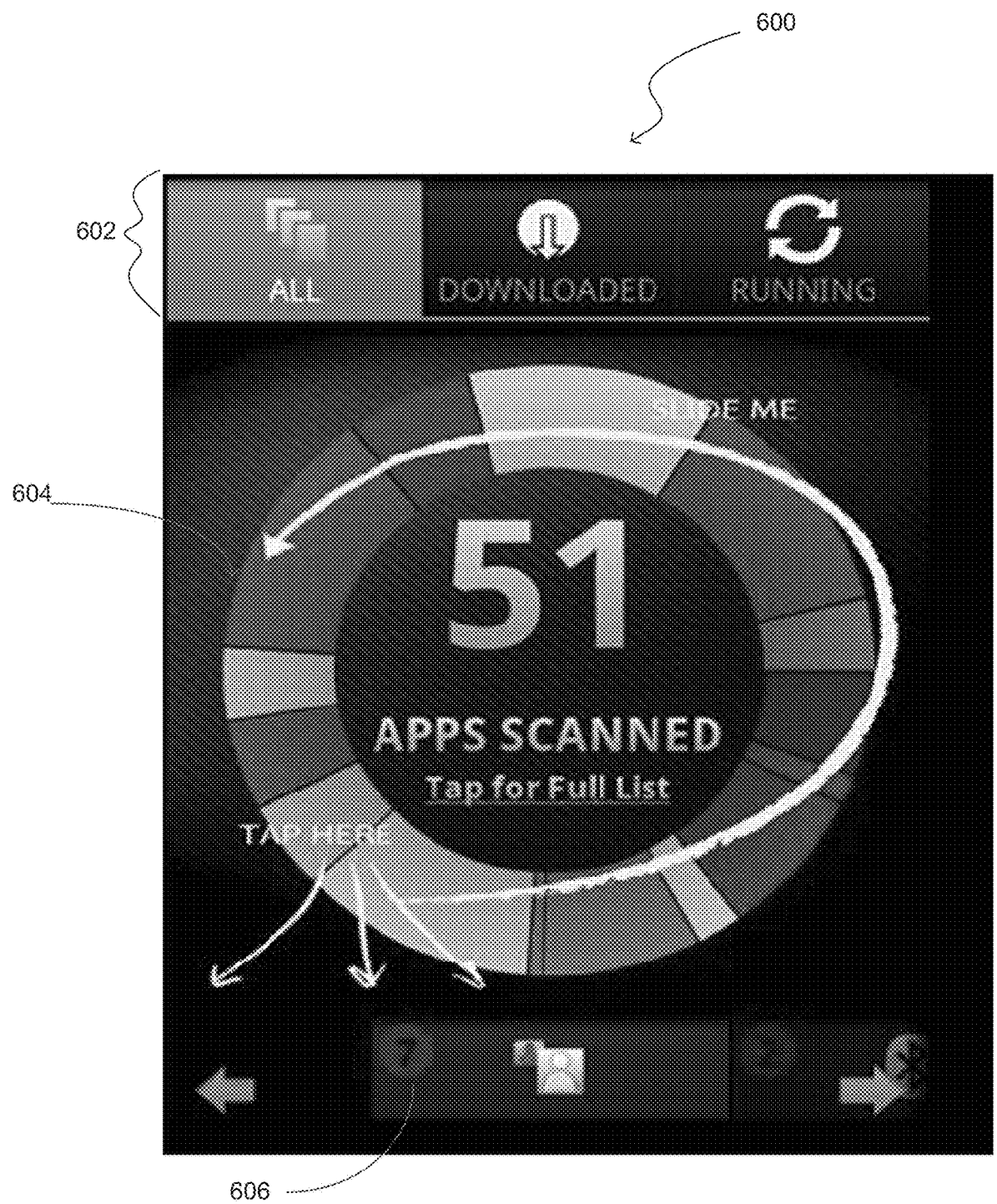

FIG. 6 shows an exemplary mobile device display of a navigation page that enables a user to review apps on the mobile device and browse them to review risk scores calculated for the apps.

Figure 7:
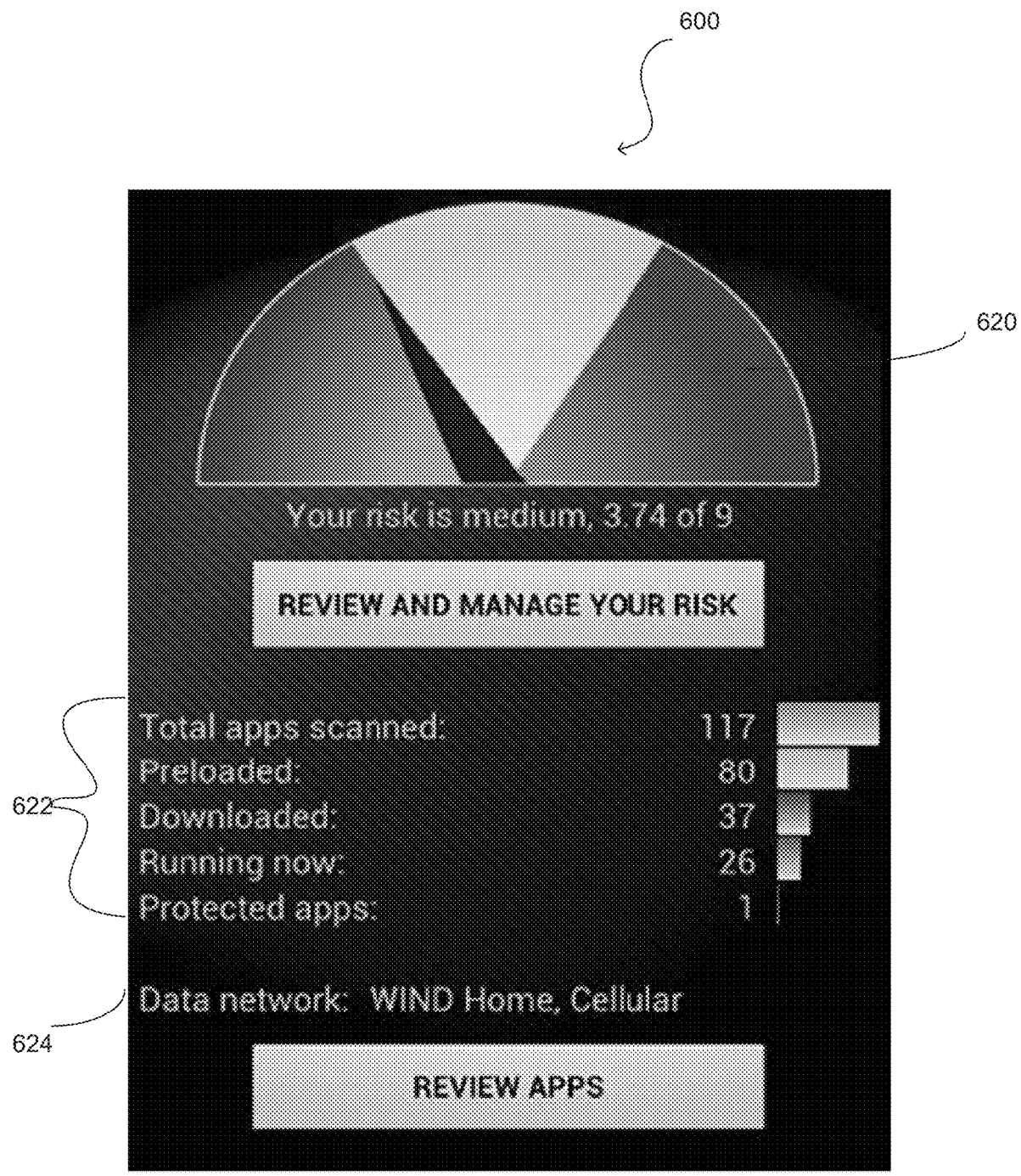

FIG. 7 shows an exemplary mobile device screen display of summary information regarding risk calculation results for apps on the mobile device.

Figure 8:
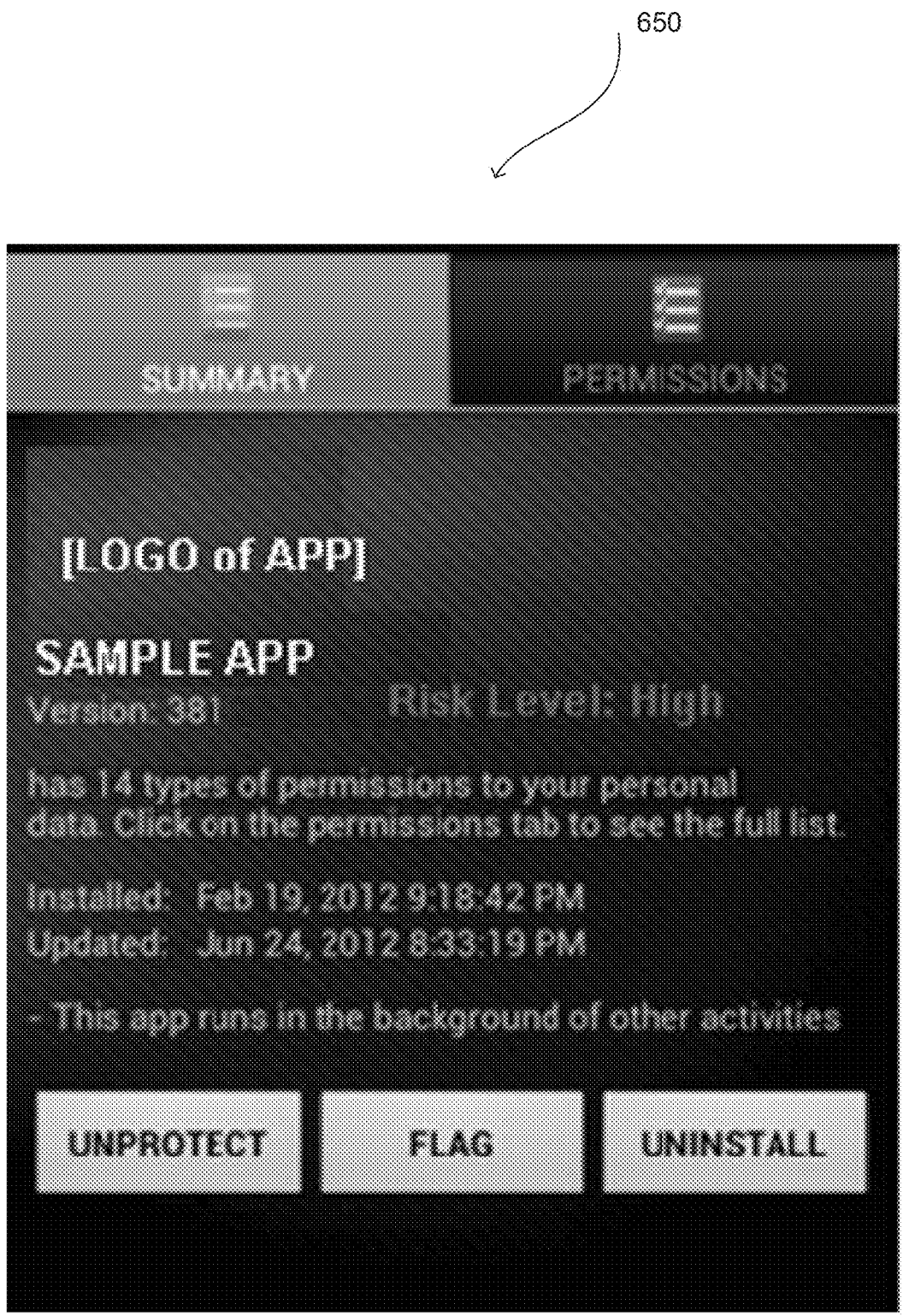

FIG. 8 shows an exemplary mobile device screen display for showing risk information for a specific app on the mobile device and including buttons for allowing a user to take remedial steps, such as uninstalling the app.

Figure 9:
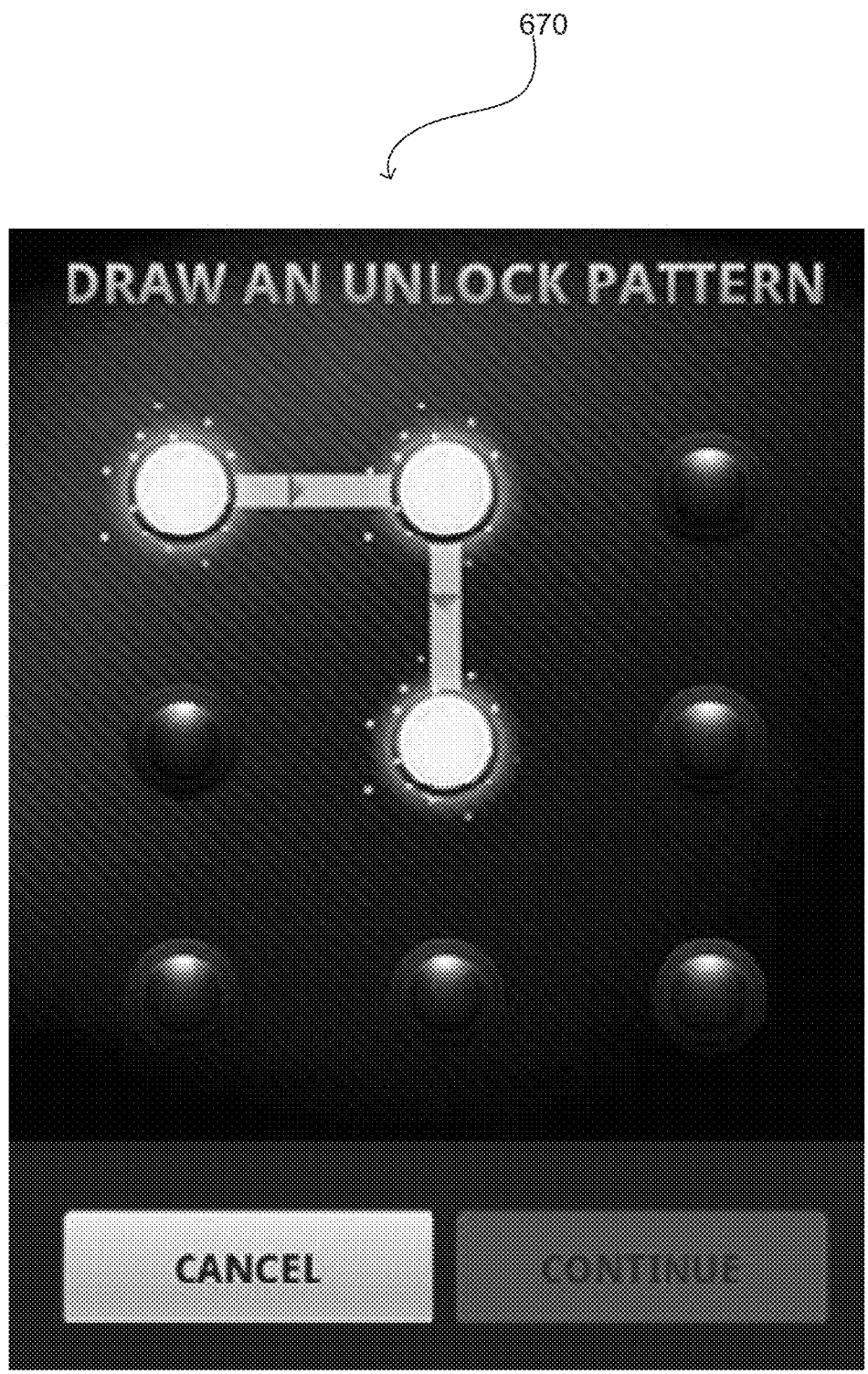

FIG. 9 shows an exemplary mobile device screen display of a privacy lock to prevent unauthorized access to the mobile device for changing the device settings or installing an app.

Figure 10:
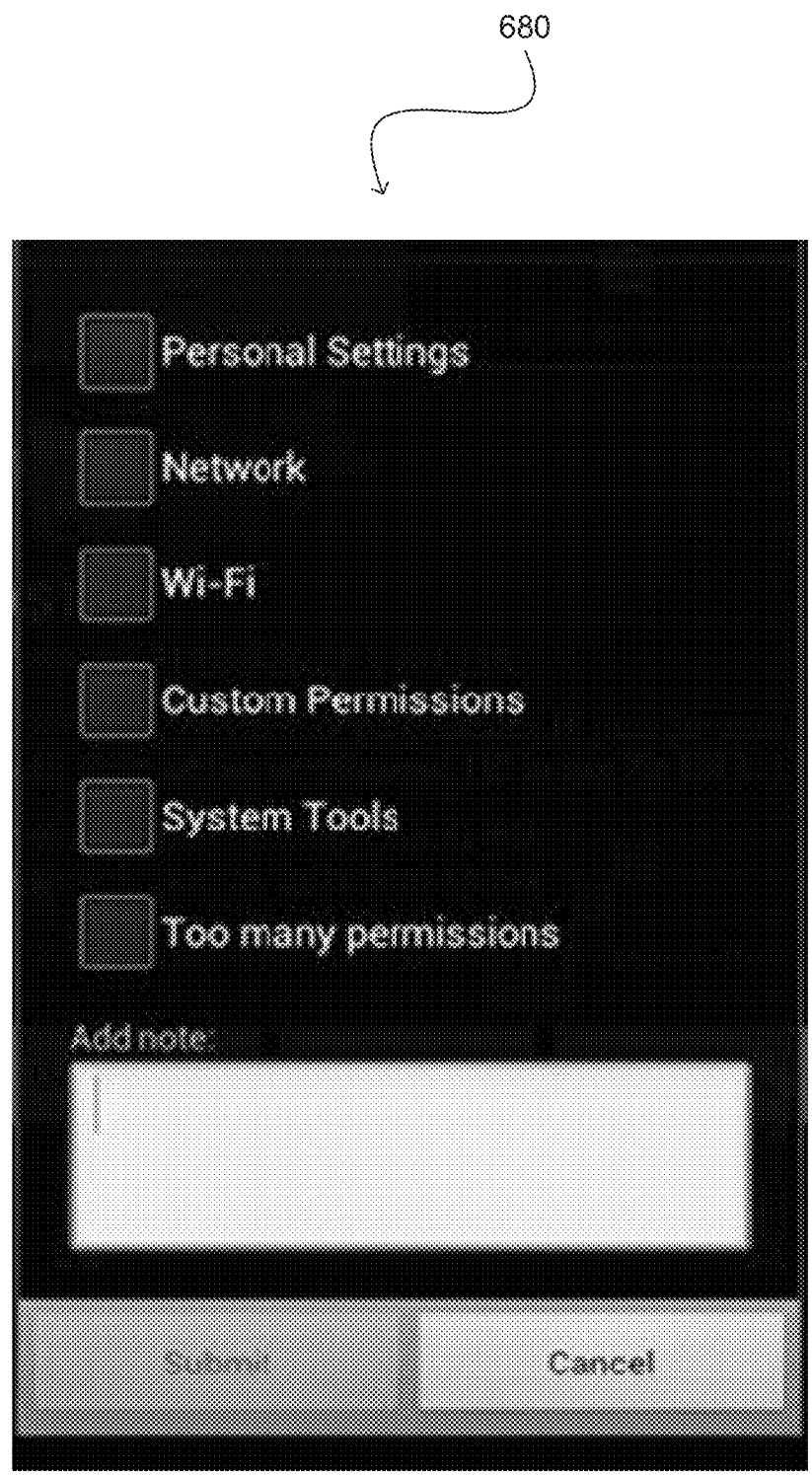

FIG. 10 shows an exemplary mobile device screen display that enables a user to provide feedback regarding concerns regarding certain attributes relating to the risk calculation for an app on the mobile device.

DESCRIPTION

In this specification, the terms "mobile device," "cell phone", "phone," "smart phone," and "device" are used interchangeably to refer to such devices. Upon reading this disclosure, it will be understood that the method and system of the invention can apply to all devices capable of receiving third party mobile applications or programs regardless of the operating system on the device, including cell phones, PDAs, laptops, Pads, Tablets, Phonelets, other mobile devices, and computers such as desktops or servers.

In general, there are aspects about a manufacturer of an app that can indicate an increased likelihood of having vulnerabilities within the apps developed by that manufacturer. For example, larger and financially stronger companies often have more qualified resources to ensure that security best practices for app development are being observed, and larger companies often face an increased risk for liability by consumers in the event of a breach, motivating the companies to implement improved audit and security quality controls. Additionally, companies in specific sectors that are subject to increased or strict regulation, such as the financial institutions or federal government contractors, are more inclined to ensure that security best practices are observed during app development due to the risks of damage resulting from compliancy violations. For example, a bank, whether developing in-house or outsourcing, would be more inclined to ensure the security of its apps than an independent developer producing a game.

Additionally, enterprise versions and consumer versions of apps pose different challenges. When an enterprise deploys an app throughout its organization, the enterprise, expects the app to be of enterpriser quality. When an organization deploys an app, the organization may rely on the app for a portion of its business. Hence if the app is not capable of delivering the expected services, the organization may have losses such as financial loss or productivity loss. Furthermore, the organization may lose its competitive edge or productivity. An enterprise app should be ready to support the enterprise at a higher level than what is expected of consumer version. Thus, an enterprise app requires more formalized approach for product development. For example, it is expected for an enterprise app to follow the software development life cycles. It is common for manufacturers developing enterprise apps to have roadmaps, gather app requirements from market and customers, address scalability challenges, and have Quality Assurance (QA) metrics and measures. Hence, it is typical for organizations that wish to purchase an app for enterprise deployment to have concerns about the app manufacturer readiness to provide an enterprise ready app. For example determining if the manufacturer has the infrastructure for supporting an enterprise app or is it capable of developing enterprise level apps or does it have the financial backing and resources to remain in business for the term of the app life or does it have the means to protect itself and organization's confidential information against cyber-attacks. Furthermore, the organization needs to know if the manufacturer has fair and equitable End User License Agreement (EULA) that protects the organization against infringement of Intellectual Properties (IP) rights. In addition, it is common for app manufacturers to incorporate third party libraries such as Open Source Software into their product. It is important for the organization to know such information in order to properly assess the risks and rewards associated with the deployment of the app.

Figure 1:
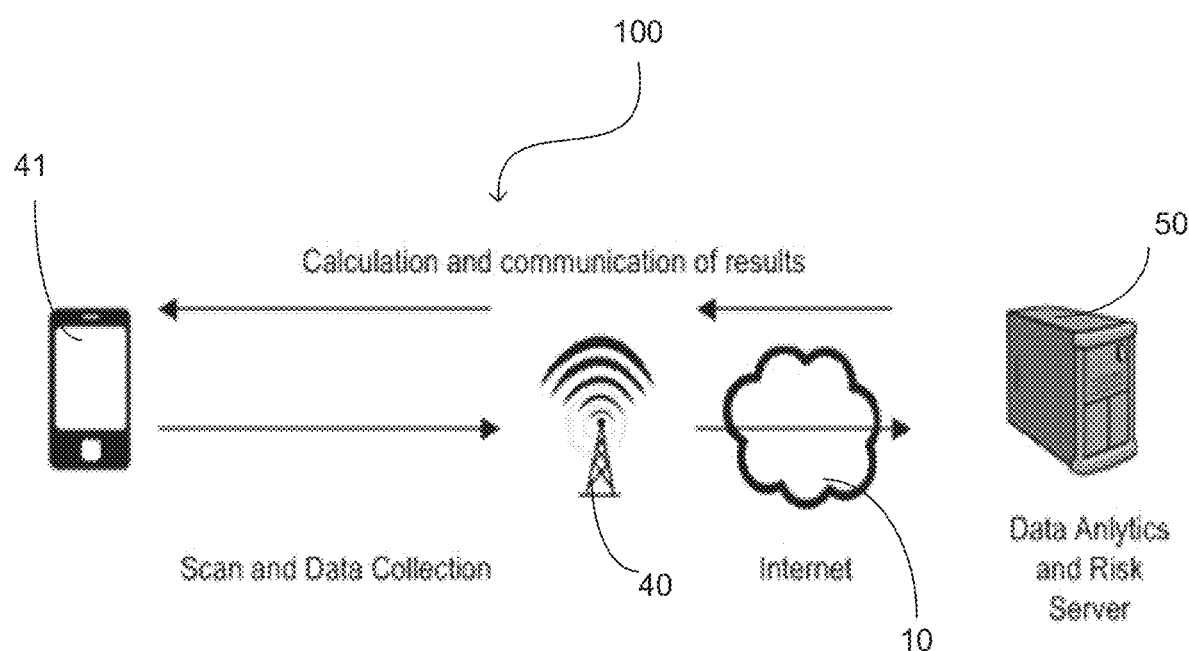
FIG. 1 is a diagram showing a system for collecting storing and analyzing information, including data about a manufacturer (sometimes referred to herein as a Company or Developer) of a mobile application, and for calculating and communicating a risk score for apps produced or maintained, or to be produced or maintained, by the manufacturer, all in accordance with the present invention.

FIG. 1 illustrates one example of a system 100 and environment for collecting storing and analyzing information, including data about a manufacturer (sometimes referred to herein as a "company" or "developer") of a mobile application, for calculating and communicating an application risk score for apps produced or maintained, or to be produced or maintained, by the manufacturer, all in accordance with the present invention. System 100 is, among other things, an example of a network-based system configured for managing information that is transferred to, transferred from, and/or stored on a mobile device, which can accomplished in many embodiments. In the example system of FIG. 1, a user owns, uses, controls, or has access to a mobile device 41, such as a mobile phone, which is serviced through a network, for example mobile phone network 40. Although one mobile phone network 40 is shown, some embodiments may include or use a number of mobile phone networks 40, which may be interconnected. As used herein, unless specifically stated otherwise, a "mobile phone network" may be a cellular network, a satellite network, a WiFi network, a WiMAX network, a wireless network, or any other suitable network for transmission of information to mobile phones and/or other mobile devices. Moreover, a mobile device may connect to a network in any suitable manner, for example via a GSM modem, a CDMA modem, and the like. Additionally, a mobile device may connect to multiple networks simultaneously, for example to a GSM network of a first carrier via a GSM modem, and to a CDMA network of a second carrier via a CDMA modem.

Still referring to FIG. 1, a data analytics and risk server 50 is in communication with the Internet 10. However, the server 50 may be in communication with a wireless carrier, a private network, a mobile phone, another server, and/or the like, via a wireless network or other means such that the server 50 does not need to be in communication with the Internet 10. In this embodiment, the server 50 is part of the system 100, which provides an example of a system for calculating risk scores for app manufacturers and for apps produced or maintained, or to be produced or maintained, by the manufacturers, and for communicating related information to a plurality of users, each user having a mobile device (e.g., 41) operating on a mobile phone network (e.g., 40). In this example, the system 100 includes, on the server 50 a risk calculation software module (not shown), which is in communication with a risk database (not shown). Upon reading this disclosure, those of skill in the art will understand that, in some embodiments, the risk calculation software module may be installed on or operating on more than one server. Also upon reading this disclosure, those skilled in the art will understand that, under appropriate circumstances, considering issues such as developments in computer hardware, software and connectivity, etc., other network configurations and devices also may suffice.

Figure 2:
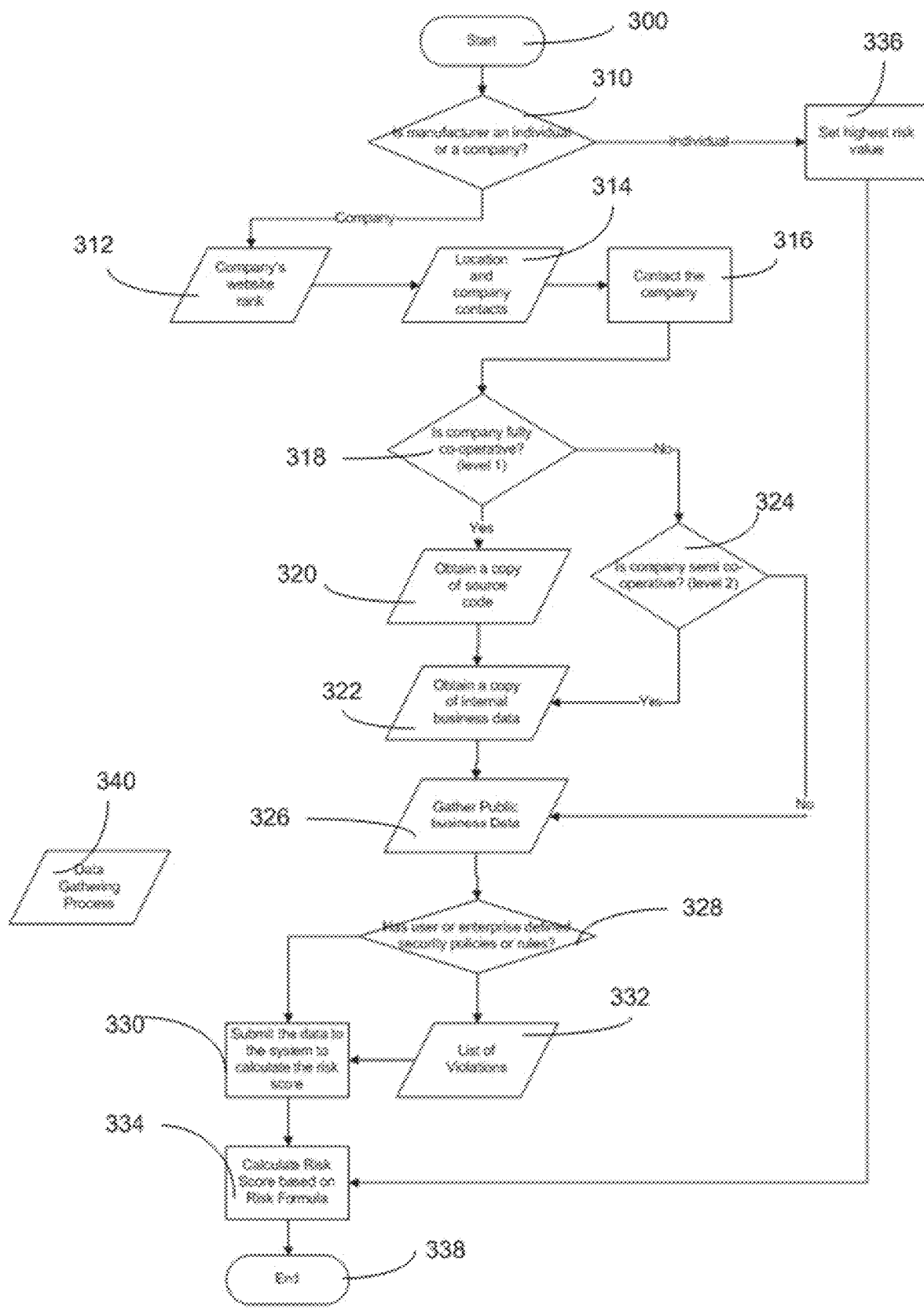
FIG. 2 is a flow diagram showing an exemplary process for gathering data about a manufacturer of a mobile application to establish a manufacturer's profile for use in calculating a risk score for apps produced or maintained, or to be produced or maintained, by the manufacturer.

FIG. 2 is a flow diagram showing an exemplary process for gathering data about a manufacturer of a mobile application to establish a manufacturer's profile for use in calculating a manufacture risk score. In the example method of FIG. 2, after the process starts (step 300), information is gathered to determine whether the manufacturer is using an individual or a company. If the manufacturer is an individual (step 336), the manufacturer risk score is set at its highest value (step 336). If the manufacturer is a company, information is collected about the company's website rank (step 312), and the location of and one or more contacts at the company (step 314). So that the company can be contacted (step 316). After contacting the company, a determination is made regarding the company's level of co-operation in providing information. If the company is fully cooperative (step 318), a copy of the source code for the app and business data of the manufacturer are obtained (steps 320, 322). If the company is only partially cooperative (step 324), only some of this information may be obtained. If the company is non-cooperative, business data for the manufacturer that is publicly available is gathered (step 326). If the user or the user's enterprise has defined security policies or rules (step 328), a list of violations of those policies or rules is generated (step 332). This list of violations, along with the other gathered information regarding the manufacturer's website, its location, its level of co-operation, its app source code analysis, and its business data, is stored in the database of system 100 as a manufacturer profile (which includes as a plurality of attributes for the manufacturer) and is submitted (step 330) for calculation of a manufacturer risk score (step 334) by the risk calculation software module, which risk score can be used to help determine the credibility of the manufacturer to produce or maintain the mobile device application.

Example Attributes of an Application Manufacturer Profile.

By way of example, the public or private business data to be gathered and stored as attributes in a manufacturer profile can include:
- a) Is the developer a fortune company (Fortune 50, 100, 500, 1000, etc.)?
- b) Is the developer a public or private company?
- c) Was the application developed in-house or contracted or outsourced to external resources?
  - i. If contracted, were the resources located in a trusted country?
    For example, US, near shore or offshore?
- d) In which region is the developer located? For example, the trust worthiness of the country is considered;
- e) Has the developer obtained management quality standards (such as ISO) that confirm its management processes and practices are controlled and monitored for the best practices?
- f) What is the website rating for the developer?
- g) The size of the manufacturer and the number of employees;
- h) Manufacturer's annual revenue to determine operation size;
- i) If a private company, whether it is funded by Venture Capitalists.
- j) The manufacturer's industry segment (financial, government, health care, law enforcement, military, education, marketing, etc.)
  - i. The segment is considered for compliancy considerations and whether specific regulations are applicable to the developer;
  - ii. If there are applicable regulations and/or certifications for the manufacturer based on its industry segment, has the manufacture obtained security certification?
- k) Manufacturer partnerships with other credible companies such as OS vendor, Device vendor, etc. can be considered as a measure of stability of the manufacturer and also of its access to knowledge and additional information;
- l) Length of time manufacturer has been in business is a measure for business stability.

Figure 3:
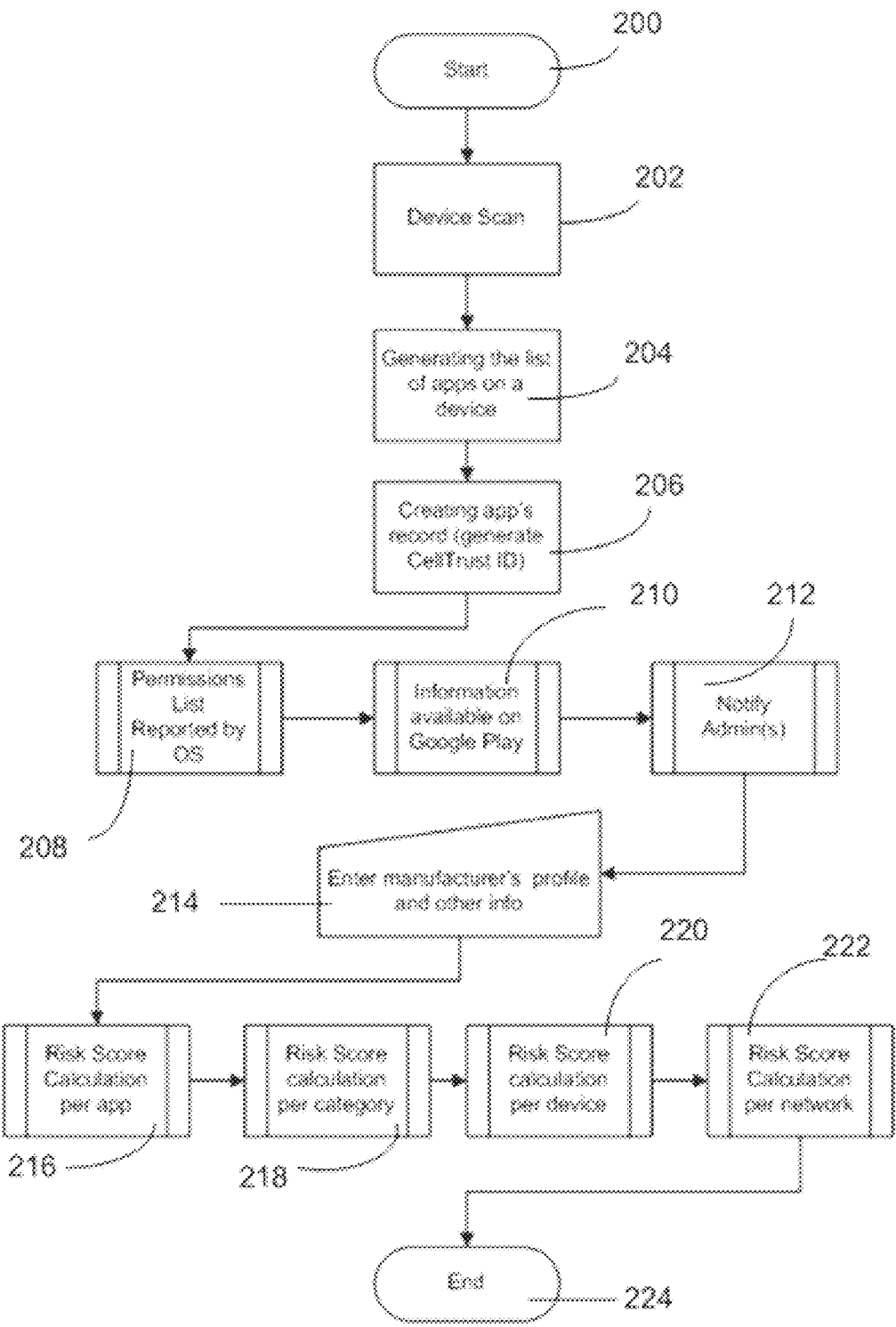
FIG. 3 is a flow diagram showing an exemplary process for gathering data about applications for use with the manufacturer profile in calculating a risk score for apps produced or maintained, or to be produced or maintained, by the manufacturer.

The manufacturer's profile and risk score can be used to determine a risk score for apps produced or maintained, or to be produced or maintained, by the manufacturer. For example, FIG. 3 shows an exemplary process for gathering data about apps on a mobile device, along with the manufacturer's profile information, for calculating a risk score for apps produced by the manufacturer. The collection of app data will now be described, followed by a description of an example of a process for using this data to calculate a risk score.

Application Access to Features and Data on a Device

In order for a software application to work on smart phones, the application needs to be installed and have proper access to the features and data on the smart phone. Thus, mobile device operating systems, including those for Android phones, Blackberry, iPhone, and Windows phones provide for such access.

For example, the Android smart phone has a permission-based system, which requires each software application to ask for permission from the user to get access to features or data stored on the smart phone. By default, mobile applications running on an Android device don't have access to any data on the device, i.e. the developer of the application decides which permissions the application will require. Otherwise the application will have no permission. A calculator application is a good example of an application with no permission to access features or data stored on a mobile phone. The calculator application uses the processing power of the mobile phone, memory and screen capability to enter data to view. It has no access to other features such as the camera or personal data stored in the address book or contact list.

The Android developer website (http://developer.android.com) defines a "permission" as "a restriction limiting access to a part of the code or to data on the device. The limitation is imposed to protect critical data and code that could be misused to distort or damage the user experience." Once granted, a permission is applied to the application as long as it is installed. To avoid user confusion, the system does not notify the user again of the permissions granted to the application, and applications that are included in the core operating system or are bundled by an OEM do not request permissions from the user. Permissions are removed if an application is uninstalled, so a subsequent re-installation will again result in display of permissions.

If an application needs access to a feature protected by a permission, it must declare that it requires that permission. When the application is installed on the device, the installer determines whether to grant the requested permission by checking the authorities that signed the application's certificates and, in some cases, asking the user. If the permission is granted, the application is able to use the protected features. If not, the application's attempts to access those features will simply fail without any notification to the user.

The table below lists some of the challenges in securing and protecting data stored on a mobile phone:

| Challenge | Description |
| --- | --- |
| Lack of list of all the permissions granted | By default it can be viewed for each app one by one |
| Meaning of permissions | There is no user friendly and comprehensive description of meaning of permissions and the consequence of them |
| Invisibility for the applications shipped with the phone | Users have no idea about the mobile applications shipped with the phone |
| Forgotten applications | Users install various mobile applications and forget about them while they might still collect data |

| Challenge | Description |
| --- | --- |
| Invisibility to what is being communicated to and from phone | Communication channels such as Internet, microphone, camera and Bluetooth can be used to collect and transmit data without user knowledge |

The following table presents five use cases that demonstrate how the Android permission model can lead to unwanted and unintended access to personal data.

| Permission Challenge | Description |
| --- | --- |
| All-or-None Permission | User has to agree with all the requested permissions or application won't be installed. |
| Frequency of Access to Personal Data | Once user has agreed to grant a permission, he or she has no control over frequency of using the permission by the application. |
| Multiple Purpose of Permissions | Same permission can be used for different purposes. |
| Permission Re-Delegation | Applications may share their permissions without user consent. |
| Auto-Start Permission | An application can always run in the background and not just by demand |

There is a fundamental challenge with how Android is categorizing and interpreting access to the personal data. From Android's point of view (defined in Android manifest), access to data is seen as a matter of function or hardware configuration, while to conduct a proper risk assessment, access to data should be considered rather than a function. As an example, if an application has access to the Wallpaper on the phone (the picture that user can set as the background on the screen), Android treats such access as a "system tools" access, even though the wallpaper picture can be a family picture or something very personal. A second example is appointments saved in the calendar application, which data the Android permission scheme doesn't consider as personal or confidential information. However, a user may consider this information (e.g., whom I will meet with, when and where for how long, with who else etc.) as personal, very sensitive or confidential.

Application Distribution (Download or Install)

Mobile phone or mobile device users have two options for obtaining software applications on their phone:
  Pre-loaded by the operating system ("OS") or handset manufacturer or telephone company ("Telco") before it is shipped to the user; or
  The software application is installed by a user.

The Android platform, for example, includes a series of mobile applications that are pre-loaded by the OS, Google. In order for the Android phone to operate, it is mandatory to have these Google mobile applications pre-loaded onto the phone. This mandatory requirement to operate the phone necessitates the user to sign-up for a Google account that supports these Google applications such as Google Gmail, Google Document, and Google Talk. There are some Google applications that are pre-loaded onto the Android phone—such as Google maps—that are not mandatory to operate the phone, but users usually don't review or uninstall these particular applications.

Companies in the handset manufacturing industry manufacture mobile phones and related wireless communications devices partly for the consumer market. Products include cellular phones and other mobile handsets used for voice calls and simple text messages, as well as advanced smart phones with data, multimedia, and networking capabilities. The handset manufacturers can pre-load some mobile applications on these mobile devices. However, this imposes two problems for the user:
  Customizing and modifying the Android platform may open up security leaks; and
  Pre-loaded mobile applications do not go through a user permission process.

The user may never know what data is being collected about them through the applications or what permissions come with the applications. Even if the user is aware of the permissions, it is difficult for him or her to know if these applications are necessary to operate the device.

In many cases, Telcos that provide network access voice, SMS and data communication also can install applications on the phones on the fly and can activate certain features such as a microphone and camera even if device is off. When the device is turned off, only certain features are disabled. Other features, such as a camera or microphone, can continue to run in the background and may still be accessible. The only way that such acts can be prevented is to remove the battery from the device.

Android users can download Android applications onto their phones from Google Play (formerly called "Android Market"), Amazon market or directly from other resources. Users can also deploy applications directly on the phone, such as by connecting the phone to a computer via USB or Bluetooth or from email attachments.

| Category | Description | Example(s) |
| --- | --- | --- |
| Android Mandatory Applications to operate the phone | Applications shipped with the Android platform. Phone won't work properly or activated at all without those mobile applications | Google Account Manager |
| Google Default Applications | Google mobile applications pre-loaded and shipped with the phone. They are not necessary to operate the phone; however they are preloaded by Google on the phone. | Google Maps, Chrome browser |
| Handset Manufacturer Applications | The mobile applications that handset manufacturer has pre-loaded on the phone, as part of its partnership with other brands or for its own purposes | HTC Foot Print app |
| Telco Applications | Applications that Telcos install over the air or pre-load on the phone | Rogers My Account app |
| User-Installed Applications | Applications that users download and install | Twitter, mobile banking app, etc. |

It is important to note the difference between an application and data. Applications usually are the only way to get access to data or use phone features. For instance, it is applications preloaded on a device that are used to activate the camera, view images in the photo gallery, read text messages and even making a phone call. Each of those applications needs certain permissions to deliver the expected functionality.

Rating Mobile Applications

When determining risks, reports from various sources can be considered. These can include reports from security authorities, device manufactures, Operating System manufacturers, carriers/mobile operators, antivirus/malware manufacturers (such as Symantec, McAfee and Kasper), analysts as well as reputable sources such as trusted labs (such as those of CellTrust Corporation of Scottsdale, Ariz.), press/news, consortiums/associations or government (or bodies designated by government). In some embodiments, the number of users using the mobile application or feedback from existing users of the mobile application can be considered in determining the risks associated with the mobile application.

To do this, a list of mobile applications that have been installed on mobile devices can be compiled (step 204) and then transferred, by a carrier network, WI-FI and or Internet or a combination thereof, to server(s) or Back End (BE) computer(s) with adequate processing power. In other embodiments, the list may be processed on the device.

Each mobile application can then be rated based on one or more of the following criteria:

1. Information and/or behavior such as:
   a) Attributes of the application itself such as Name, version, size, release date and/or signature of the App or signature of a portion of the app or signature of a code inside the App;
   b) The purpose of the App or the functionalities promised by the App including the features of the app or services performed;
   c) Resources that App has access including permissions to data (see step 208);
   d) Resources the App is consuming;
   e) Resources the App is attempting to use without permission or without proper notification of the user of the phone;
   f) Specific access permission to phone features such as hardware or communication channels. Examples of communication channels are: data connection via WI-FI, Internet or network of Telcos or a combination thereof. Other examples of communication channels are: NFC, Bluetooth, Infrared, SMS, MMS, phone calls, etc. Examples of specific access permission to phone features are: contact list, phone storage, call data such as missed calls, received calls, or calls made. The application's behavior—for example, the sequence of the App's access to phone features—can be considered. The data that is transferred via WI-FI, Internet, carrier networks or combination thereof—such as the content of the data or the destination of the data such as the recipients URL address—can also be considered.
   g) Whether the application is flagged by third party anti-virus and or anti-mal ware software. Reports ports from security authorities, device manufactures, Operating System manufacturers, carriers and mobile operators, analysts as well as reputable sources such as trusted labs, including the evaluating entity's labs, press and news, consortiums and associations or government (or bodies designated by government) are considered when determining the risks. The numbers of users using the application and/or feedbacks from existing users of the application is considered in determining the risks;
   h) Stability of the application and/or quality of the application is considered;
   i) Performance of the application, such as resource consumption including: memory, CPU, WI-FI, DATA/ carrier network, Internet as well as storage of the device is used to determine the risks;
   j) Compliance of the application with regulations, if applicable, can be considered. For instance, if the application is built to work with health care, does it comply with HIPAA regulation? If the application is built to work with financial information, does it comply with relevant financial regulations (e.g. FINRA (see http://www.finra.org/Industry/Regulation/).
   k) Best practices are considered. For example, weather a legitimate VPN is established to secure connection;
   l) The application's proper display of availability and/or disclosure of a Privacy Policy are considered;
   m) Where a Privacy Policy is available, whether it is clear, accurate and conspicuously accessible to users and potential users;
   n) Whether the App offers a Short Privacy Statement to highlight potentially unexpected practices;
   o) Whether the App offers Privacy Controls to allow users to make, review and change their privacy choices;
   p) Whether the App allows the user to modify permissions to the data on the phone. For example, can the user disable access to tracking the location of the phone?
   q) Whether the App uses special notices or the combination of a short privacy statement and privacy controls to draw the user's attention to data practices that maybe unexpected and to enable the user to make meaningful choices;
   r) Whether the App uses out-of-App ads that are delivered by modifying browser settings or placing icons on the mobile desktop;
   s) Whether the App enables delivery of targeted ads through the platform that App is operating on;
   t) The App's proper display of availability and/or display of Terms of Use are considered;
   u) The App's proper display of availability and/or display of license agreement are considered;
   v) Whether the App keeps the collected data on the device or stores it on a server via Internet;
   w) If the App is storing the collected data on the device, does it encrypt the data or use other measures to protect the data?
   x) If App communicates the collected data to a server, does it encrypt the data or use other measure (such as use of HTTPS and other secure communications methods) to protect the data in transition?
   y) When data is transferred and stored on a server, is there a data policy to control access to the data, and does a data retention policy exist?
   z) When data is stored on the device, is there a retention policy? For example, an App might save username or user password on the device. Does the application remove it after it doesn't need it?
   aa) The ability of the App to charge a credit card or carrier billing (such as Premium SMS a.k.a SMS Billing). This can happen on an ad-hoc basis or through pre-defined mechanisms such as in-App payments or subscriptions provided by the Google Play (see step 210) or other application store services such as App Store, Kindle store, etc.
   bb) Does the App ask for Personally Identifiable Information (also referred to as "PII"), such as name, phone number, email, social security number, etc.?
   cc) If the App collects Personally Identifiable Information, is it necessary to provide the promised service or functionality of the App? For example, if a piece of information on the device can be considered Personally Identifiable Information given its combination with other information, the data from the PII can be reviewed. Some data by itself might not be considered PII. However, that data will be considered PII when combined with other information. For example, the location of a phone by itself is not considered PII. However, if combined with a phone number, or device ID, or even some other information such as email address that the user has used to login to the device, the location information becomes PII.

dd) Ask whether the App is sharing the collected data with third parties. This can happen for billing purposes (e.g., Google Check out, PayPal, Credit Companies, Banks or other financial institutions), advertisement agencies, marketers, data mining and analytics companies, customer service companies (if customer service or support is out-sourced by the manufacturer).

ee) Does the App use an App-specific or other than a persistent, globally unique identifier?

ff) Are default settings of the application privacy protected?

gg) Does the App's Privacy Policy get updated regularly?

hh) Does the App provide access to the user to review data collected about the user?

ii) Does the App provide access to the user to correct or delete data collected about the user?

jj) We may quarantine an App and stop it from running;

kk) We may disable certain functionality of the OS such as Wi-Fi, Bluetooth, etc.;

ll) We may uninstall an App;

mm) We may block an App from installing;

nn) We may stop the OS from turning a functionality on such as Wi-Fi, Bluetooth, etc. (if off we stop it from turning on);

oo) We may download an App to the evaluating entity (sometimes referred to in this disclosure as "Cell-Trust") for analysis;

pp) We may issue a bulletin regarding an assessment on an App or conditions an App is running under. We may lock the handset;

qq) We may reboot the handset;

rr) We may reset the handset;

ss) Rewrite the memory in the handset with new data to grantee the old data is deleted.

2. Device information, configuration and status (see step 220):

a) The signal strength connecting the phone to the mobile operator;

b) The signal strength connecting the phone to a Wi-Fi network;

c) The battery level of the phone and or battery consumption rate and/or the data plan consumption rate can be considered. An example is the amount of data consumed by the application and or frequency that the application is communicating through the Internet which might indicate unwanted data communication;

d) Connectivity of a phone to an external power source, such as an AC power outlet or a Personal Computer;

e) Consideration can be give to the device's International Mobile Station Equipment Identity ("IMEI"), which uniquely identifies a device, if available. This can be used to identify the status of the device, i.e., stolen or lost;

f) The International Mobile Subscriber Identity ("IMSI") parameter can be used to identify the current Telco that operates the phone;

g) Consideration can be given to whether the latest version of the OS is installed on the phone (OS version);

h) Consideration can be given to whether the latest Hardware and Firmware version is installed;

i) Consideration can be given to the OS Status and the phone can be examined to determine whether the current OS is the original OS shipped with the device or if it has been "unlocked" or there has been "jail breaking";

j) Whether all applicable Patches for the device's firmware, OS, and other installed software or applications are up-to-date;

k) Phone number, if available. Otherwise send an SMS and capture the SMS and find the phone number;

l) For Android phones, whether the option to download applications from unknown resources is allowed (check the Settings App) or download is restricted to Google Play (see step 210) or other official markets, where applicable;

m) Whether communications channels such as Wi-Fi, NFC, Bluetooth, Infrared, etc. are enabled or disabled;

n) Whether a protection mechanism on the phone is in place, such as availability of anti-virus and anti-malware software;

o) Device Management Status (e.g., is the device being locked down by a device management service or not). For example, a lock down might prevent the users from getting access to the Settings of the phone;

p) The percentage of internal or external memory used;

q) Custom permissions defined by the application. Such custom permissions might include a way the application obtains access to the data, how it stores it or how it communicates with the servers on Internet.

3. Application Manufacturer's profile. (see FIG. 2 and step 210) The following set of information enables an evaluation of the application manufacturer's (a.k.a. developer's) credibility and ability to produce and maintain a high quality application.

m) Is the developer a fortune company (Fortune 50, 100, 500, 1000, etc.)?

n) Is the developer a public or private company?

o) Was the application developed in-house or contracted or outsourced to external resources?
   i. If contracted, were the resources located in a trusted country?

For example, US, near shore or offshore?

p) In which region is the developer located? For example, the trust worthiness of the country is considered;

q) Has the developer obtained management quality standards (such as ISO) that confirm its management processes and practices are controlled and monitored for the best practices?

r) What is the website rating for the developer? (see step 312)

s) The size of the manufacturer and the number of employees;

t) Manufacturer's annual revenue to determine operation size;

u) If a private company, whether it is funded by Venture Capitalists.

v) The manufacturer's industry segment (financial, government, health care, law enforcement, military, education, marketing, etc.)
   iii. The segment is considered for compliancy considerations and whether specific regulations are applicable to the developer;
   iv. If there are applicable regulations and/or certifications for the manufacturer based on its industry segment, has the manufacture obtained security certification?

w) Manufacturer partnerships with other credible companies such as OS vendor, Device vendor, etc. can be considered as a measure of stability of the manufacturer and also of its access to knowledge and additional information;
x) Length of time manufacturer has been in business is a measure for business stability.
4. Application usage:
a) This set of information identifies adoption and acceptance level of the App by the users and or consumers.
  i. How many users have installed the App?
  ii. How many users have uninstalled the App?
  iii. How many users are actively using the App?
  iv. User demographic distribution (age, sex, etc.)
  v. User geographic distribution
  vi. Users' language distribution
b) Users' evaluation and feedback through different mechanisms can be considered. The feedback will be collected through different channels such as market rating, comments, reviews on market (e.g. for Android phones via Google Play and for Apple's iOS products via App Store), forums, blogs, wikipedia, and social media through hash tags;
c) What is the credibility of the users rating the App? Are users from a known source, such as an enterprise? Have users provided an email address or other means of communications?
d) Ranking in store. The ranking can be based on total ranks entered in the market (usually by giving stars), but some statistics such as how many weeks an App has been a top seller or the number one App in the application market or store;
e) Length of time in the store. How long the App has been available in the store?
f) In some situations, the way that a device or mobile application is used can be considered as high risk—such as when a device is used as at a workplace by an enterprise that has set some rules or policies (see step 328). Although such rules or policies may not be an actual permission for access by the application, the polices may impact the risk level for the application. In another words, having sound company policy for corporate liable phones may help reduce the risk associate with the application. An example of this would be an enterprise having a policy that the corporate phone (phone provided by the company) cannot be used for games or having a policy that the phone may not be used by other family members (such kids to play game). If an enterprise does not have such policy, then the risk is elevated. As another example, an enterprise might require its users to register or login to an App when they use their device at their workplace. As another example, an enterprise might require its employees to only connect to secure Wi-Fi, or only connect to a pre-approved list of Wi-Fi (Trusted Hotspots), and violating such rules might lead to higher risk for the user or the organization.
5. Was the application certified by an evaluating entity? A comprehensive process can be implemented to review, analyze and evaluate mobile applications installed on mobile phones and devices for security and privacy risks that the mobile applications impose. Evaluations are made in the context in which the application is being developed and used. Certification by an evaluating entity, and achieving a good ranking, can be considered in assessing the security and privacy risk of an application. Considerations include:
a) Did the manufacturer of the App cooperate with the evaluating entity in ranking the App? (see steps 318, 324)
b) Did the App manufacture allow the evaluating entity to access and or review the App's source code? (see step 320)
c) Did the evaluating entity test the App in its lab?

App Assessment Method

An app evaluation process according to a presently preferred method of the invention includes a mix of automated and manual steps. The automatic process can includes collecting information about the app, scanning its permissions, behavior and any other information provided by the OS via the Application Program Interfaces ("API") provided. The manual review is preferably conducted in a lab. The behavior of the mobile application is monitored and analyzed by reviewing log files, communications it makes, data access attempts, etc.

At a deeper level, the source code of the application is reviewed (if provided by the developer) for a deep analysis and evaluation. This includes, but is not limited, to analysis and evaluation of the following criteria:
a) Code quality, such as architecture, code structure, proper use of the technology and following the best practices.
b) Hidden functionality that is not exposed to the user.
c) Suspicious code that may perform tasks differently from what is advertised or communicated to the user. For example, if an mobile application is asking permission for the location of the user per user's request, tracking the location automatically without user awareness falls under this category.
d) Communication and sending data to destinations that are not designated servers. For instance, if a service provider is obligated to host the data collected on a server hosted within designated country borders, it cannot use a server hosted in a different country to store the data.

Referring to steps 318-322 of FIG. 2, the evaluation program for application developers is voluntary. A process for developers can allow them to submit their application and supportive information and materials for review. For example, a website for application manufacturers can be deployed to allow them to submit their applications for review.

The opportunity to review, evaluate and assess the potential risks that an application might impose to data security on a device depends on the level of co-operation by the developer of the application. The three levels of co-operation are:

1. No Co-Operation.

There is no application information available except for the reports generated automatically by the OS. For this level, publicly available data is relied upon, about both the App and the developer. For the App, an automatic assessment of the App is installed on a phone to understand the permissions the App has gained of the data and how it is used, where possible. Additionally, a review and analysis of the App is performed in the lab by monitoring and using the log files generated in the development environment.

2. Some Co-Operation by Providing Business and Operation Data.

At this level, there is no access to the application source code; however, there may be limited access to some documentation such as design, use cases, etc. that the developer has provided. The same rule applies to the business data where a developer shares some internal data about how it conducts its business that can help to assess the quality of the application and the operation behind it. For example, was the development out-sourced, off-shore, on-shore or in-house? Has the business obtained any security certification? Based on its financial statements, is the business stable? Has the business filed any trademark or patent applications to protect its business and technology (if any), etc.?

3. Source Code Review.

At this level, the developer is fully open to providing all the internal information and access to the source code for evaluation of the business technology and operation. In addition to the data from level 3, this may include additional information about the team members who have developed the application, their experience, environment (Physical, IT, etc.), list of customers, etc.

Calculation and Assessment of Risks

After the data about a manufacturer and its apps is collected, security and privacy risks can be assessed. This includes assessing the developers behind the installed applications, the mobile applications themselves and any other data. The collected data may be stored and analyzed on a mobile device or on a back-end server to calculate the security risk.

The method includes all the parameters that fit in a formula that will calculate the risk. The risk may be calculated per data category (see step 218) (e.g., security risk to disclose messages, tracking location, monitoring calls, copying files in a gallery, etc.) or per App (see step 216) (what is the security risks imposed by App X), or per function (unwanted activation of microphone), etc. Overall risk can be calculated per given context (neutral) or applicable context. For example, use of the phone in a hospital to communicate patient data (healthcare context). The description below of exemplary risk calculations sets forth additional information and examples of such a formula, which uses variables such as permissions, manufacture and so on, to calculate the risk.

Risk is a context-based concept. Something that might mean a considerable risk for one person might be seen as a normal situation for another. Also for the same person, a status that might be considered a risky situation might be considered a normal situation based on some parameters such as time, location and other parameters. For instance, if a phone is connected to a secure data network (see step 222), the level of risk to get hacked is different from the situation where the same phone is connected to a public, unsecured network. Another dimension can be the type of mobile applications being used under each of those conditions. Some applications provide more security and present less risk when used with an unsecured connection. Other applications might be more vulnerable because of the lack of security considerations. Various situations might affect security such as releasing the location of the user; some parameters might put other data such as messages, photos at risk of unwanted disclosure.

Use of Categories and Parameters

According to one important aspect of the invention, parameters are created for a dynamic weighting system to assess and calculate the security risks on mobile phones. In this dynamic system, a number of parameters are included and are given a different weight to calculate the risk at any given time and situation. For example, network status, location, time, user, etc. can be included parameters. The included parameters, the likelihood of the parameters changing and the possible impact on risk can be considered to quantify the risk Based on phone configuration and status changes, including the installed mobile applications, the security risk might change on the phone. For instance, the risk of being hacked is reduced, if an application enables the user to connect only to secure Wi-Fi or to trusted hotspots. A low risk example might be when a user uses lock down settings on the phone that disallows access unless a master key or lock pattern is used. To mitigate risks, parameters are used to produce a list of recommendations for the user. New levels of the risk for the user are calculated once the recommendations have been applied to the phone.

The risk calculation method utilizes a series of parameters that can be grouped in different ways under categories. Each Category may include one or more Categories (other than itself) and/or one or more Parameters.

Parameters can come from different types of data. Some examples of such types of data are:

1. Privacy score: Privacy score is calculated based on application's permissions to user data (reported by OS), resources or features on the phone: consist of type of data on the phone an app gets access to and level of access. Level of access (from normal access to system access)

2. Manufacturer (a.k.a Developer) profile: This data describes the company or organization that has created the application 3. Device configuration and status: this data type includes the parameters which affects behavior of the application 4. Usage: This data assesses the market usage and feedback by the users 5. Policies introduced by the app: This data makes an assessment of business logic of the app and its practices to handle the data 6. Protection methods: Where protection methods are in place, they will reverse the risk level and will be reflected in the calculation 7. Other types of data that might be added at later time.

Once a score for each permission and category is calculated, the calculated risk per category in relationship with other parameters or categories will be calculated to eventually calculate the overall risk. Then result is normalized to make the calculations for different categories comparable, where the case might be.

FIG. 4 is a diagram illustrating an example, according to one preferred method of the invention, of how parameters, or types of data (such gathered data about a manufacturer), can be grouped into one or more categories (such as a manufacturer category and a privacy category) and how scores for each of the parameters and categories can be used to calculate an overall risk score. Referring to FIG. 4, the general formula for this method is as follows:

Assume Category 1=C1
We have C1, C2, . . . , Cm
Assume Parameter 1=P1
We have P1, P2, . . . , Pn
Definition: Each Category may contain one or more Categories (other than itself) and/or one or more Parameters.
In general, Ci contains C1, C2, . . . , Cj Categories and P1, P2, . . . , Pk Parameters
Which could be represented as Ci={C1, . . . , Cj, P1, . . . , Pk}
Note that C1 . . . j or P1 . . . k could be null
Now assume Rank1=R1
We have R1, R2, . . . , Ra Assume Weight 1=W1
We have W1, W2, ... Wb
Assume Vulnerability 1 is V1
We have V1, V2, ..., Vc
R1 is Rank associated with Category C1 and R2 is the Rank associated with Category C2. In general, Ra is the Rank with Category Ca (assuming a<m)
Rank R1 uses Weight W1 and Vulnerability V1 to calculate the Rank for Category C1. Hence Rank is a function of Weight and Vulnerability $$Ra=F(Wb,Vc)$$

Following are some examples of more specific application of the general formula illustrated by FIG. 4:

Example 1

C1 contains P1
P1 has a Weight factor of W1
P1 has a Vulnerability value of V1
Hence R1 is a function of W1 and V1 or R1=F(W1, V1)
One formula for R1 could be the product of W1 and V1 (W1 multiplied by V1) or R1=W1*V1
With this formula, suppose V1 can have values of 1, 2, 3 or 4
And suppose W1 is 3
Suppose V1 for P1 is 2
Hence R1 which is the Rank for P1 will be 3*2 or 6

$$R1=W1*V1=3*2=6$$

Example 2

C2 contains P1, P2, ..., Pd $$R2=F(F(W1,V1),F(W2,V2), ... ,F(Wd,Vd))$$

Suppose F(W,V)=W*V
Suppose F(W1,V1), F(W2,V2)=(W1*V1)+(W2*V2)
Suppose d=4
Hence C2 contains P1, P2, P3, P4

$$R2=(W1*V1)+(W2*V2)+(W3*V3)+(W4*V4)$$

Example 3

C3 contains P1, P2, ..., Pe

Example 4

C4 contains P2, P3, ..., Pf

Example 5

C5 contains C3 and C4

Example 6

C6 contains C3 and P5, P6, P7, ..., Pf

Example 7

C7 contains C5, C6, ... Ca, P6, P7, ..., Pf

Example 8

C8 may contain SMS, MMS, Email Categories. C8 may be referred to as "Messaging Category"

C9 may contain SMS-Read, SMS-Send, SMS-Delete Parameters. C9 may be referred to as "SMS Category"
Hence, C8 is a superset of C9, or C9 is a subset of C8.

Example 9

C10 may be Manufacturer Category and include information such as fortune rating, public/private status, employee size and so on.

Example 10

C11 may be access to confidential information Category and contain information such as access to contact information, access to phone records information, access to SMS messages and so on.

Example 11

C12 may be access to network infrastructure such as access to carrier network, access to wifi and so on.

Example 12

C13 may contain C10, C11 and C12 Categories.
Hence R13 which represent the Risk associated with Category C13 is measuring the vulnerability risk associated with an app that has access to private or confidential information while it is capable of sending such information via network. If the manufacturer of the app is an unknown entity or a high risk source, the app could potentially present a high risk factor, while if the manufacturer is a fortune 50 publicly traded company, the app could be considered relatively safe.
If the app's source code is reviewed by the evaluating entity and it is determined that the app does not contain any malicious code and the app does not send the private or confidential information to an unauthorized destination, the evaluating entity will override the Rank R13 to represent a safe app.

Example 13

C14 could be a Category containing information for device configuration and status
C15 could be a Category containing information from the market feedback by other users and number of downloads as well as the information regarding the history of the manufacturer or the manufacturer reputation for creating high risk or low risk apps.
C16 could be a Category containing information for policies introduced by the app and make an assessment of business logic of the app and its practices to handle the data. Furthermore, this Category may consider how app disclosed the privacy information and followed best practices.
C17 could be a Category containing information regarding protection methods in placed on the app. When protection methods are in place, the device is considered hardened or there may be other apps monitoring malicious behaviors on the device or the resources of the device are lockdown for example firewall, antivirus, IDS/IPS and son on. Patch management and security best practices may fall under this Category as well. Such features will reverse the risk level and will be reflected in the calculation.
C18 could be a Category containing C13, C14, C15, C16 and C17.

Hence R18 is the risk associated with Category C18 and considers variety of information to determine the security pasture of the device.

Example 14

C19 could be a Category containing permissions of the app. For example, in Android, this could be access to location and access to network. Typically, R19 could indicate a high risk app as the app could potentially send the location information to an unknown source through the network.

C20 could be a Category containing type of the app as well as C19. For example, the app could be a map. R20, which is the Rank for C20 Category, will reduce the risk associate with the app since location and network are considered typical core functionalities of a mapping app.

Example 15

C21 could be a Category containing permissions of the app and the type of the app. For example, in Android, the app could have access to location, access to network as well as access to contact list while the type of the app is a map.

R21 which is the Rank for C21 Category will increase the risk for the app. Although it is expected of a map to request access to location and network, the app has no apparent reason to access the contact list. However if the app also has a feature to show your friends within your vicinity, the access to contact list may be justified and hence the Rank adjusted accordingly.

Example 16

C22 could be a Category containing permissions of the app and the manufacturer of the app. Assume the manufacturer is a fortune 100 company with a good track record of developing secure apps with best practices. Suppose the app has access to network, contact list, messages and location which typically results in a Rank that indicate the app is high risk. The reputation of the manufacturer would adjust the Rank associate with the Category to a low risk app.

FIG. 5 shows some other examples of specific categories and parameters used for calculating an overall risk score according to the present invention. Referring to FIG. 5, each category calculation is based on a value for each parameter and its given weight (w) in the calculation, then calculated score is normalized and the weight of category is calculated.

$$([Param(1)*w(Param(1))]+[Param(2)*w(Param(2))]+\ldots+[Param(n)*w(Param(n))])/n$$

For example, in calculating of privacy score, Permission Level to data which is set by from 1 to 4 is assigned for each parameter (lower sensitivity has lower number, if an app has SMS read permission it is one permission times 1. If an app can read system logs, it is 1 param times 4).

Once a score for each category is calculated, it can be normalized based on the following logic: For any risk scenario, an impact needs to be calculated. In order to calculate the impact, a best case scenario and worst case scenario is calculated. For this purpose, the Calculator app is considered as the best case scenario benchmark. Calculator doesn't have any access to any data stored on the phone, doesn't use any storage, doesn't need access to Internet, etc. all it needs is CPU power and communication with a screen to get user input, do some calculations and return the result. Therefore the weight of impact on security by calculator is the lowest therefore the likelihood is the lowest. This is considered the best case scenario. The worst case scenario is an app that has highest access to all the data it has requested and access to and in addition it runs all the time in the memory of the phone, has connection to Internet, etc. This can be the worst case scenario. The best case scenario is considered 1 score, the worst case scenario is considered 9, and the actual situation is mapped between 1 and 9.

Once each category is normalized based on the above method, total Risk for each app is calculated by assigning a weight to each category:

$$R(1)=([S(cat(1))*W(cat(1))]+[S(cat(2))*W(cat(2))]+\ldots+[S(cat(n))*W(cat(n))])/n$$

S=Score

Cat (n): Normalized calculation for category n

W (cat(n)): Weight of normalized category n

Note: in calculation of normalizing each category, a multiplier might be applied to reflect special cases. For instance, in calculation of wifi connection, if phone configuration forces the phone to connect only to secure connections, the risk for that category will be reduced, therefore in normalization a multiplier (a number between 0 and 1) will be applied.

$$N(cat(n))=[S(cat(n))*W(cat(n))]*\mathrm{Norm}(n)$$

If there are more than one parameters involved in normalization, the above process repeats for a selected category. For instance, for wifi connection, phone might be forced to connect to (1) secure Wi-Fis AND only (2) to a pre-selected list of trusted Wi-Fis. Therefore, a second norm value will be applied:

$$N2(cat(n))=N1(cat(1)*\mathrm{Norm}(2))$$

Once R(1) is calculated, then applicable protection methods will be applied to R(1) to calculated the final risk (will be R(2). For instance, if the application is protected by an Unlock Pattern which prevents unauthorized manual access to app to launch it, then the total risk for that app will be reduced. On the other side, if the app is listed as a malware, or with suspicious behavior, then R(2) will be calculated as a higher rate:

$$R(2)=R(1)*\mathrm{Method}\,(1)$$

$$R(3)=R(2)*\mathrm{Method}\,(2)$$

$$R(n)=R(n-1)*\mathrm{Method}\,(n-1)$$

R(n)=Final Calculated Risk based on current categories, parameters inside them and the weight assigned to each one.

Presenting Risk Assessment Information

According to one aspect of the invention, once a risk is quantified, it can be communicated to a user of a device or to an administrator. Referring generally to FIGS. 6-10, exemplary embodiments and methods for doing so in a manner that allows the user to visualize the risk information for an app and to take steps to mitigate the risk will now be discussed. isk calculation formula, as well as summarizing the risk results in text format, two levels of visualization is used.

FIG. 6 shows one exemplary mobile device display of a navigation page 600 that enables a user to browse for risk information regarding apps on a the mobile device and to review the risk scores calculated for the apps. As shown in FIG. 6, the navigation page summarizes information gathered in a way that enables the user to review all the applications available on a device and browse them per different attributes. Examples of such attributes are preloaded applications, downloaded applications, applications running in the memory, etc. This method also includes the categories (described in risk calculation formula) to enable the user to navigate the apps under each category and then by clicking on each app review its risk ranking and other related information, such as parameters analyzed and ranked to calculate the risk.

As can be seen in the example of FIG. 6, a user can review all the apps installed on the phone (51) and see which ones have access to Address Book on the phone (7 in the example). By sliding a wheel 604 on the screen, the user can navigate the apps and see the name and a summary of their risks on the screen without a need to leave the page 600.

FIG. 7 shows another example of mobile device screen display 602 of summary information regarding risk calculation results for apps on the mobile device. With this example, the user is presented with a risk gauge 620 that show her the quantified value of the risk calculated. The display also presents additional risk information 622, including the exact number of risk results from the risk calculation and a summary of how many applications have been scanned to calculate the risk. The display 602 can also present other important information 624, such as the current data network that device is connected to, whether the connection is secured or not, number of apps running in the memory, etc.

Risk Mitigation

The purpose of risk calculations and visualization to the users is to help them to manage their risk and control it. Accordingly, another aspect of the invention can include linking the calculated risk results with remediation and recommendations to mitigate the risk. The risk results can include a list of applications and the risks associated with each one. The list can be sorted per risk level (e.g., showing the applications highest risks at top). This allows the user to review high risk application on his or her device and to stop or uninstall them if they are not used often.

The information displayed for risk remediation and mitigation recommendations can be driven from details of risk calculations and factors that were used to calculate the risk. For example, a recommendation can be made to user to prevent the phone to connect to unsecured Wi-Fi's.

Another example is to recommend that the use of a utility to create a list of trusted hotspots and prevent the device from connecting to non-trusted Wi-Fi's.

As still another example, a recommendation can be made to the user to use a utility to add a privacy guard or lock to the selected application to prevent unauthorized manual access. This can be useful when user passes her phone to another person to see some information (e.g. a photo) but doesn't want the other person to change the settings on the phone, install an application that can be potentially a virus or spyware, etc. The lock can be in the form of a text password, or a visualized pattern which requires the user to draw a pattern by connecting some locks. FIG. 9 shows an exemplary mobile device screen display 670 of such a privacy lock to prevent unauthorized access to the mobile device for changing the device settings or installing an app.

As yet another example, a user can be provided with a shortcut to stop or uninstall an application on the mobile device if it is tagged as high risk. FIG. 8 shows an exemplary mobile device screen display 650 showing risk information for a specific app on the mobile device, which include a buttons for uninstalling the app.

As still another example, after reviewing the attributes of an application, if user is concerned about some attributes (such as specific permissions to get access to data on the phone), the user can be provided with an option to flag such (see app (see FIG. 8) and specify the permission that has caused concern. Such feedback from user can be analyzed, manually or automatically, and provide the user with additional information, recommendation step, etc. FIG. 10 shows an exemplary mobile device screen display that enables a user to provide feedback regarding concerns regarding certain attributes relating to the risk calculation for an app on the mobile device.

Upon reading this disclosure, those skilled in the art will appreciate that various changes and modifications may be made to the preferred embodiments of the invention and that such changes and modifications may be made without departing from the spirit of the invention. Therefore, the invention in its broader aspects is not limited to the specific details, representative devices, and illustrative examples shown and described. Accordingly, departures may be made from such details without departing from the spirit or scope of the general inventive concept.

What is claimed is:

1. A method for evaluating a security posture of a mobile device, the method comprising:
   gathering manufacturer information about one or more manufacturers of each of a plurality of mobile applications;
   using the manufacturer information to establish a manufacturer's profile for each manufacturer associated with each of the plurality of mobile applications;
   using the manufacturer's profile to calculate a manufacturer risk score for each of the one or more manufacturers and storing the manufacturer risk score in a risk database;
   automatically scanning information provided by the mobile device operating system via one or more application programming interfaces to discover one or more application risk attributes of one or more mobile applications installed on the mobile device;
   transferring from the mobile device to a backend server computer, by one or more of a carrier network, WI-FI or the Internet, each of the application risk attributes, wherein the backend server computer includes a risk calculation software module in communication with the risk database;
   with the risk calculation software module, determining a risk for each of the plurality of mobile applications installed on the mobile device as a function of the application risk attributes of the mobile application and the manufacturer risk score for each manufacturer associated with the mobile application; and
   with the risk calculation software module, calculating an overall risk score of the mobile device as a function of the risk for each of the plurality of mobile applications installed on the mobile device.

2. The method of claim 1 wherein the step of using the manufacturer profile to calculate the manufacturer risk score further includes assigning a weight to each of a plurality of manufacturer attributes derived from the gathered manufacturer information.

3. The method of claim 2 wherein the plurality of manufacturer attributes includes two or more of:
   whether the manufacturer is a fortune company;
   whether the manufacturer is a public or private company;
   whether the manufacturer is a corporation or an individual;

whether the manufacturer has obtained management quality standards for confirming that its management processes and practices are controlled and monitored for the best practices;
the manufacturer's size;
the manufacturer's number of employees;
the manufacturer's annual revenue;
how the manufacturer is funded;
the manufacturer's industry segment;
whether the manufacturer is in a regulated industry;
the manufacturer's geographical location;
the manufacturer's length of time in business; and
a ranking of the manufacturer's website.

4. The method of claim 3 wherein the manufacturer's industry segment is selected from at least one of financial, government, health care, law enforcement, military, education and marketing.

5. The method of claim 2 wherein the manufacturer attributes include the manufacturer's industry segment and whether the manufacturer has obtained a certification related to its industry segment.

6. The method of claim 2 wherein the step of calculating the manufacturer risk score includes associating each of the manufacturer attributes to one or more categories and calculating a risk associated with each of the categories.

7. The method of claim 6 wherein the step of calculating the manufacturer score includes assigning a weight to each of the categories.

8. A method for assessing security and privacy risks of a mobile application, the method comprising:
    gathering manufacturer information about a mobile application manufacturer associated with a mobile application installed on a mobile device, wherein the manufacturer information includes at least one of:
        publicly available information about the manufacture; and
        private information provided by the manufacturer;
    with a data analytics and risk server computer including a risk calculation software module in communication with a risk database, storing the gathered manufacturer information in a manufacturer profile;
    with the risk calculation software module; using the manufacturer profile to calculate and store a manufacturer risk score that reflects the credibility of the manufacturer to produce or maintain a mobile device application;
    with the mobile device in communication with the at least one of the data analytics and risk server and the risk database, automatically scanning information provided by the mobile device operating system via one or more application programming interfaces to discover application risk attributes of one or more of a mobile application installed on the mobile device; and
    calculating a security and privacy risk for the mobile application as a function of the manufacturer risk score and the application risk attributes of the mobile application.

9. The method of claim 8 wherein the step of using the manufacturer profile to calculate the manufacturer risk score further includes assigning a weight to each of the plurality of manufacturer attributes.

10. The method of claim 9 wherein the plurality of manufacturer attributes includes two or more of:
    whether the manufacturer is a fortune company;
    whether the manufacturer is a public or private company;
    whether the manufacturer is a corporation or an individual;
    whether the manufacturer has obtained management quality standards for confirming that its management processes and practices are controlled and monitored for the best practices;
    the manufacturer's size;
    the manufacturer's number of employees;
    the manufacturer's annual revenue;
    how the manufacturer is funded;
    the manufacturer's industry segment;
    whether the manufacturer is in a regulated industry;
    the manufacturer's geographical location;
    the manufacturer's length of time in business; and
    a ranking of the manufacturer's website.

11. The method of claim 10 wherein the manufacturer's industry segment is selected from at least one of financial, government, health care, law enforcement, military, education and marketing.

12. The method of claim 9 wherein the manufacturer attributes include the manufacturer's industry segment and whether the manufacturer has obtained a certification related to its industry segment.

13. The method of claim 8 wherein the step of calculating the manufacturer risk score includes associating each of the manufacturer attributes to one or more categories and calculating a risk associated with each of the categories.

14. The method of claim 13 wherein the step of calculating the manufacturer score includes assigning a weight to each of the categories.

15. A system for assessing security and privacy risk of a mobile application, the system comprising:
    a data analytics and risk server computer including a risk calculation software module in communication with a risk database and a mobile device;
    wherein the risk database is configured to store gathered profile information about a mobile application manufacturer;
    wherein the risk calculation software module is configured to use the manufacturer profile to calculate a manufacturer score that reflects the credibility of the manufacturer to produce or maintain a mobile device application;
    wherein the mobile device is in communication with the data analytics and risk server via one or more of a carrier network, WI-FI or the Internet;
    wherein the mobile device is configured to automatically scan information provided by the mobile device operating system via one or more application programming interfaces to discover and analyze one or more application risk attributes of one or more of a plurality of mobile applications installed on the mobile device; and
    wherein one or both of the mobile device and the data analytics and risk server is configured to use the manufacturer score and the discovered and analyzed application risk attributes for each mobile application installed on the mobile device to calculate a security and privacy risk.

16. The system of claim 15 wherein the risk calculation software module is configured to calculate the manufacturer risk score further by assigning a weight to each of a plurality of manufacturer attributes derived from the gathered manufacturer information.

17. The system of claim 16 wherein the risk calculation software module is also configured to calculate the manufacturer risk score by assigning a weight to each of the manufacturer risk attributes.

18. The system of claim 17 wherein the plurality of manufacturer risk attributes includes two or more of:

whether the manufacturer is a fortune company;
whether the manufacturer is a public or private company;
whether the manufacturer is a corporation or an individual;
whether the manufacturer has obtained management quality standards for confirming that its management processes and practices are controlled and monitored for the best practices;
the manufacturer's size;
the manufacturer's number of employees;
the manufacturer's annual revenue;
how the manufacturer is funded;
the manufacturer's industry segment;
whether the manufacturer is in a regulated industry;
the manufacturer's geographical location;
the manufacturer's length of time in business; and
a ranking of the manufacturer's website.

19. The system of claim 18 wherein the manufacturer's industry segment is selected from at least one of financial, government, health care, law enforcement, military, education and marketing.

20. The system of claim 19 wherein the manufacturer risk attributes include the manufacturer's industry segment and whether the manufacturer has obtained a certification related to its industry segment.

21. The system of claim 17 wherein the risk calculation software module is also configured to calculate the manufacturer risk score by associating each of the manufacturer risk attributes to one or more categories and calculating a risk associated with each of the categories.

22. The method of claim 19 wherein the risk calculation software module is also configured to calculate the manufacturer score by assigning a weight to each of the categories.

23. The system of claim 15 wherein the security and privacy risk of one or more of the mobile applications installed on the mobile device is used to calculate an overall risk score for the mobile device.

24. The method of claim 8 wherein the security and privacy risk of the mobile application installed on the mobile device is used to calculate an overall risk score for the mobile device.

* * * * *